United States Patent
Masciarelli, Jr.

(10) Patent No.: US 6,401,900 B1
(45) Date of Patent: Jun. 11, 2002

(54) UNIDIRECTIONAL ROTATING SUPPORT ASSEMBLIES AND SYSTEM USING SUCH ASSEMBLIES

(76) Inventor: Camillo A. Masciarelli, Jr., 415 Berlin Rd., Marlborough, MA (US) 01752

( * ) Notice: Subject to any disclaimer, the term of this patent is extended or adjusted under 35 U.S.C. 154(b) by 0 days.

(21) Appl. No.: 09/523,766

(22) Filed: Mar. 11, 2000

(51) Int. Cl.[7] ............................................... B65G 13/00
(52) U.S. Cl. ............................... 193/35 MD; 193/35 R
(58) Field of Search ........................ 193/35 R, 35 MD

(56) References Cited

U.S. PATENT DOCUMENTS

| | | | |
|---|---|---|---|
| 2,671,242 A | | 3/1954 | Lewis |
| 3,509,978 A | * | 5/1970 | Bedford ................... 193/35 R |
| 3,763,980 A | * | 10/1973 | Vom Stein et al. ........ 193/35 R |
| 3,902,583 A | * | 9/1975 | Laibson et al. ......... 193/35 MD |
| 3,915,275 A | * | 10/1975 | Specht ..................... 193/35 R |
| 4,036,345 A | | 7/1977 | Webb |
| 4,108,455 A | | 8/1978 | James |
| 4,382,637 A | | 5/1983 | Blackburn et al. |
| 4,459,909 A | | 7/1984 | Takagi |
| 4,553,795 A | | 11/1985 | Takagi |
| 4,627,526 A | | 12/1986 | Masciarelli |
| 4,660,994 A | | 4/1987 | Masciarelli |
| 4,706,793 A | | 11/1987 | Masciarelli |
| 4,732,490 A | | 3/1988 | Masciarelli |
| 4,787,808 A | | 11/1988 | Shimoji et al. |
| 4,819,554 A | * | 4/1989 | Fleischer et al. .. 193/35 MD X |
| 5,301,785 A | * | 4/1994 | Plesh, Sr. ................. 193/35 R |
| 5,390,775 A | * | 2/1995 | Herrick et al. ..... 193/35 MD X |
| 5,409,096 A | | 4/1995 | Clopton |
| 5,538,346 A | * | 7/1996 | Frias et al. ........ 193/35 MD X |
| 5,673,780 A | * | 10/1997 | Bildsoe ................ 193/35 MD |
| 5,857,554 A | * | 1/1999 | Toye ....................... 193/35 R |
| 5,915,515 A | | 6/1999 | Blair |
| 6,019,211 A | | 2/2000 | Masciarelli, Jr. |
| 6,120,185 A | * | 9/2000 | Masciarelli, Jr. ... 193/35 MD X |

* cited by examiner

Primary Examiner—James R. Bidwell
(74) Attorney, Agent, or Firm—Kriegsman & Kriegsman

(57) ABSTRACT

Featured is a unidirectional rotating support assembly that is located in one or more apertures provided in a surface of a work station, a scissors lift, a cart conveyor or any other work station, bench, table, platform or device known in the art involving the transportation of articles. Typically the work surface includes a plurality or more of such apertures. The unidirectional rotating support assembly of the present invention generally includes a unidirectional rotating member, a support member and a rotating member support mechanism that rotatably supports the unidirectional rotating member with respect to the support member. The support member is configured or arranged so a portion thereof is received in the aperture in such a fashion that the support member has limited, if any, ability to move with respect to the work station surface (e.g., axis of rotation for the rotating member has limited motion transverse to and/or along the axis or rotation). Thus, the rotating member also is maintained in a relatively fixed position with respect to the work surface. The support member includes an aperture therein, whose long axis is generally perpendicular to the work surface. The rotating member support mechanism is arranged so a portion thereof extends across this aperture or opening in the support member such that the unidirectional rotating member is disposed therein. The supporting mechanism in a particular embodiment is an axle and the unidirectional rotating member can be one of a wheel or a roller.

26 Claims, 17 Drawing Sheets

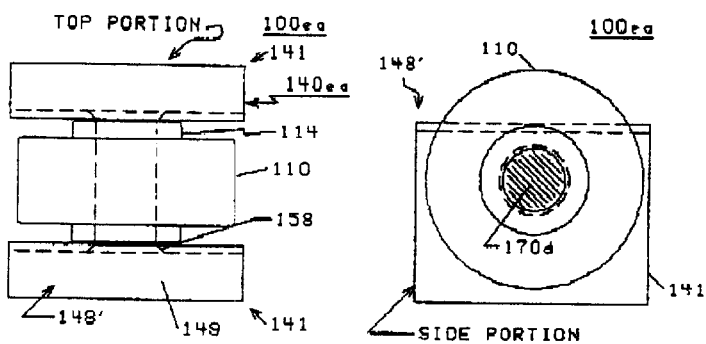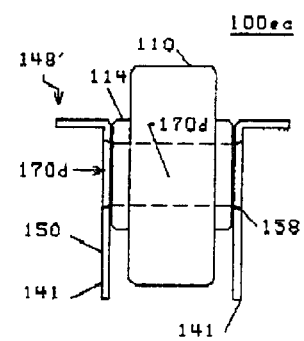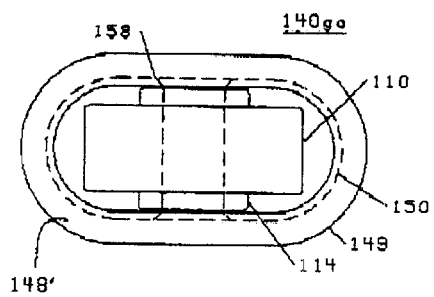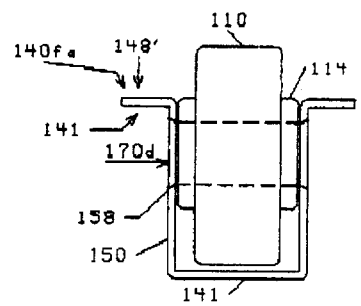

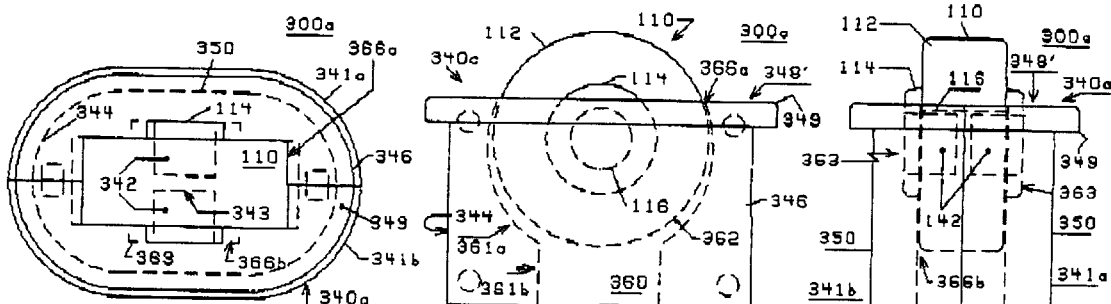
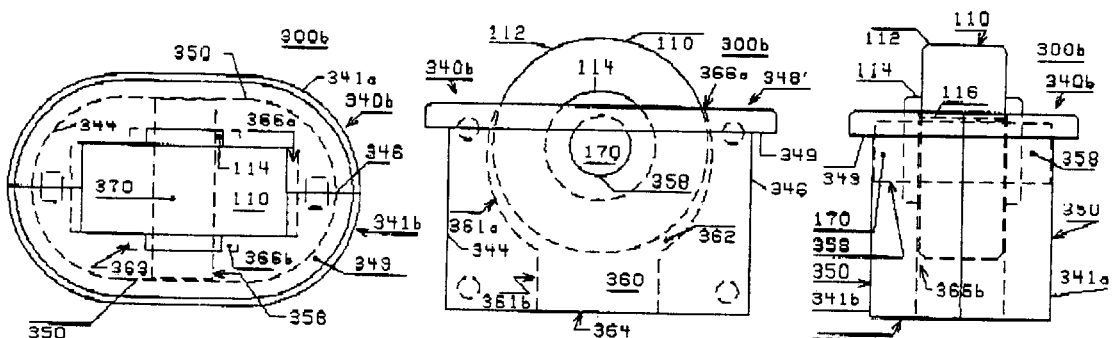
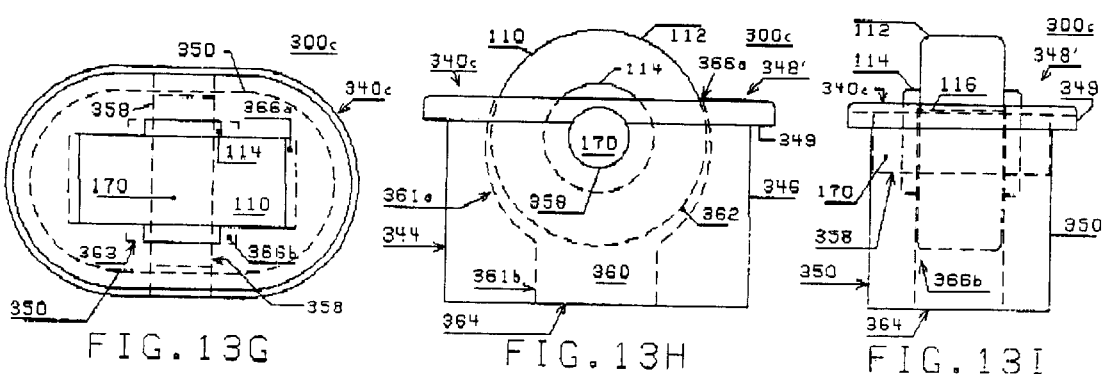

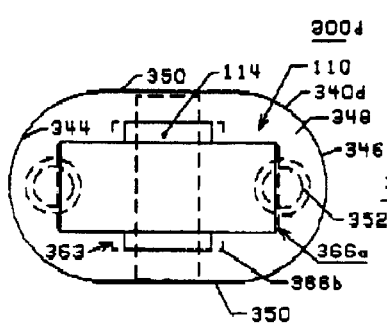
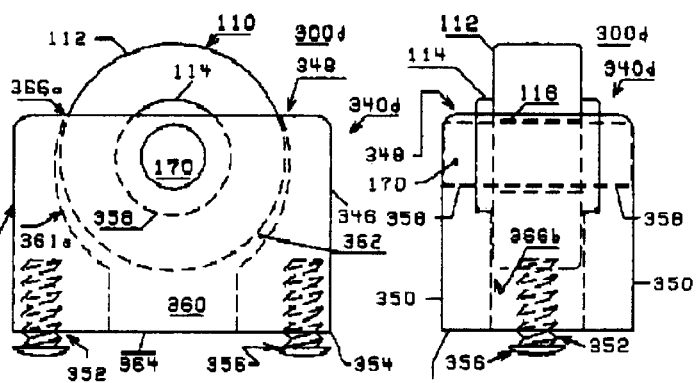
FIG. 15A  FIG. 15B  FIG. 15C

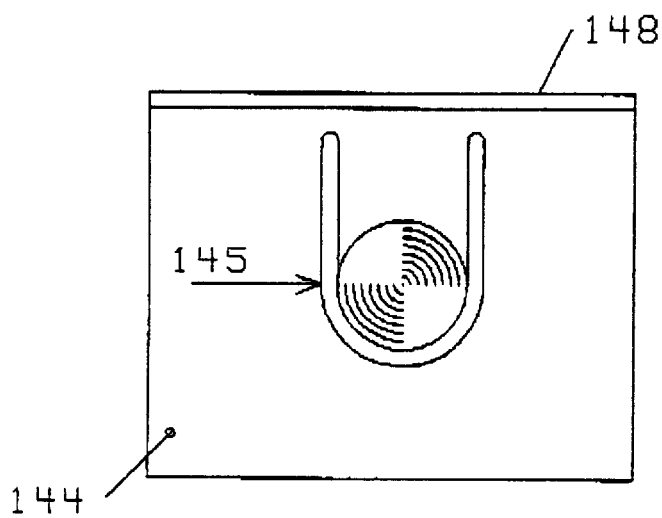
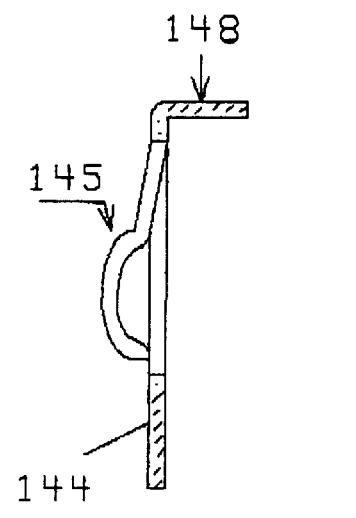
FIG. 20A  FIG. 20B
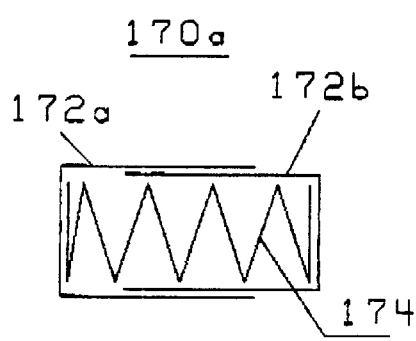
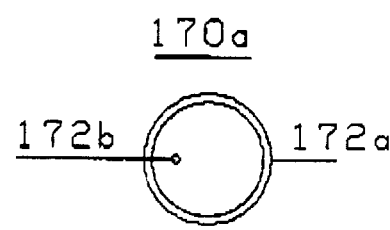
FIG. 19A  FIG. 19B
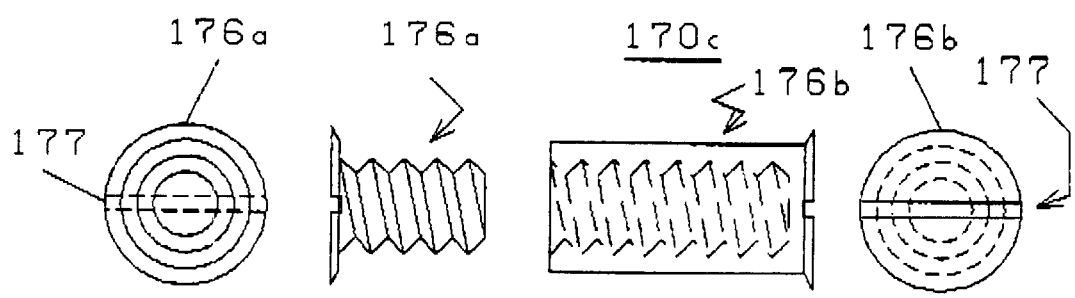
FIG. 19D  FIG. 19E
FIG. 19C ated in relation to the relative position of the transport path in order for the item to be transferable from the transport path to the surface of the work station. In particular, if the transport path and/or the work station surface are configured to include means (e.g., pop up balls) that allows the worker or transfer device to roll the item on and off the mechanism comprising the transport path.

UNIDIRECTIONAL ROTATING SUPPORT ASSEMBLIES AND SYSTEM USING SUCH ASSEMBLIES

FIELD OF INVENTION

The present invention relates to devices that both support and allow an article to be transported in a given direction and more particularly to devices that provide unidirectional rotational support of an article as it is moved on, across and off a work surface and while on the work surface to a location where the article can be worked on, where the work surface can be the surface of a stand alone bench, the surface of a series of work benches, the surface on a cart or a lift or the like and where the work bench or work station can be an integral part of the transport path.

BACKGROUND OF THE INVENTION

During a manufacturing process or the packaging of a product, it is common for a number of manufacturing or packaging steps to be performed in series at discrete locations such as work benches or work stations. For convenience, reference shall be made hereinafter to work stations although it shall be understood that reference is also being made to a work bench. For example, after a device such as a radio, television or personal computer, is put in its shipping package or box, various items such as wires, remotes, parts for assembly (e.g., screws), and instruction manuals are placed into the box along with other components comprising the packaging (e.g., protective foam). Also, and as example, when constructing an apparatus or device such as a personal computer a multiplicity of different and specific components are installed into the housing or chassis comprising the device. Typically, the manufacturing process for making such apparatuses or devices have the components installed in certain sequences and by different people so as to improve productivity and quality. It should be recognized that the above-identified processes and products is only exemplary, and that the foregoing also applies to other types of manufacturing processes and products, including but not limited to mechanical devices such as air conditioners and automobile parts/components, electrical devices such as motors and switches, solar panels, and fluid and electromechanical types of devices.

In simplistic terms, the package, housing, chassis or other item being shipped or assembled is transported along a predetermined path, by means of a conveying belt, a delivery vehicle (e.g., cart) with or without transfer surfaces such as those manufactured and sold by Omtec Corporation, or the like, so it passes various work stations at which the discrete tasks are to be performed. When the item being assembled or package arrives at the work station, the worker thereat removes the item or package from the transport path, delivery cart or the like and places it on the surface of the work station. It is also possible for the article to be carried or delivered to the work station by a person, who places it on the work station. The designated task is performed and the worker returns the item or package back to the transport path and the process is repeated again at other work stations until the item is completely assembled or the packaging process is completed.

In one arrangement, the transport path is located adjacent to the surface of the work station. In another arrangement, a depression is formed in or machined out of the work station surface that at least equals the size and shape of the apparatus that would form or comprise the transport path. Thereafter, the transport apparatus (e.g. conveyor bed section) is inserted into the depression. In either case, the worker or a transfer device at a given work station has to draw the item off the transport path and onto the work station surface.

With either arrangement, the work station must be located in relation to the relative position of the transport path in order for the item to be transferable from the transport path to the surface of the work station. In particular, if the transport path and/or the work station surface are configured to include means (e.g., pop up balls) that allows the worker or transfer device to roll the item on and off the mechanism comprising the transport path.

In the case of the above-described second arrangement, the work station must be precisely located so the transport path can pass through the work station without affecting the routing of the transport path. Such an arrangement also is costly and time consuming because of the relative size and configuration of the depression and because of the accuracy required to provide or machine such a depression in the work station surface.

It thus would be desirable to provide an device that can be easily installed in the surface of a work station while providing the capability to rotatably support and transport the article unidirectionally. It would be particularly desirable to provide such a transporting device that would allow the work station to be easily integrated with the mechanism(s) or apparatus(es) comprising the transport path. It also would be desirable to provide such an item transporting device that would be simple to install in a work station surface as compared to prior art devices as well as providing a mechanism for reducing injuries and back problems caused by the lifting, pulling and moving of heavy items as is done with prior art techniques. Such item transporting devices preferably would be simple in construction and less costly than prior art devices and such methods would not require highly skilled users to utilize the device.

SUMMARY OF THE INVENTION

The present invention features a unidirectional rotating support assembly that is located in an aperture provided in a surface of a work station, a scissors lift, a cart conveyor or any other work station, bench, table, platform or device known in the art involving the transportation of articles. The work station surface typically includes a plurality or more of such apertures, thus this surface would be arranged so as to also include a plurality or more of unidirectional rotating support assemblies. The number of uni-directional rotating support assemblies and the spacing of the assemblies provided in the work station surface is dependent upon a number of factors including the support requirements for the item or article being transported and the type of rotating member for the rotating support assembly. For example, a flat surface of a cardboard box generally requires more support as compared to the surface for a relatively rigid metal or plastic housing or chassis of an electronic device such as a personal computer.

In general terms, the unidirectional rotating support assembly of the present invention includes a unidirectional rotating member, a support member and a rotating member support mechanism that rotatably supports the unidirectional rotating member with respect to the support member. The support member is configured or arranged so that a portion thereof is received in the aperture in such a fashion that the support member has limited, if any, ability to move with respect to the work station surface. In other words, the axis of rotation for the rotating member has limited motion transverse to and/or along the axis or rotation. Preferably, the support member and aperture are arranged so there is a slide-fit between outer surfaces of the support member and opposing surfaces of the aperture. Alternatively, the support member and the aperture are arranged so there is a snug fit or an interference fit therebetween. In this way, the rotating member also is thus maintained in a relatively fixed position with respect to the work station surface.

The support member also includes an aperture or open area therein, whose long axis is generally perpendicular to the work station (e.g. top surface) surface when the support member is disposed within the work station surface aperture. In a particular embodiment, the support member includes a centrally disposed through aperture or open area.

The rotating member support mechanism is arranged so a portion thereof extends across this aperture or opening in the support member such that the unidirectional rotating member is disposed therein. The supporting mechanism in a particular embodiment is an axle and a pair of mounting devices provided in opposed relation on the support member. The unidirectional rotating member can be one of a wheel or a roller.

In specific embodiments, the unidirectional rotatable support assembly further includes an adjusting mechanism that acts on the support member so as to adjust the relative position of the unidirectional rotating member, namely the axis of rotation therefore, with respect to the work station surface. More particularly, the adjusting mechanism extends between a bottom surface of the support member and a bottom surface of the work station surface aperture. The adjusting mechanism also can include a plurality or more of adjusters for the support member, where each adjuster extends between the support member bottom surface and the aperture bottom surface. In an illustrative embodiment, a portion of each adjuster is threadably disposed in a threaded aperture in the bottom surface of each of the support member.

In another embodiment, the support member is configured with an extension segment that extends outwardly from at least the sides of each support member. In this way, a bottom surface of the extension segment rests upon the work station surface when the support member is disposed in work station aperture. The extension segment is preferably proximal a top surface of the support member and extends outwardly from a substantial portion of the circumference for the support member portion, for example ½, ⅔, or ¾ of the circumference or two or three sides of the support member.

In an exemplary embodiment, a unidirectional rotating support assembly according to the present invention includes a support member, a portion of which is configured so as to be received within each aperture provided in a work station surface, a unidirectional rotating member, and a rotating member support mechanism disposed within the support member and being configured to rotatably support the unidirectional rotating member. Preferably, the support member portion received within the aperture includes a geometric configuration that is complementary of the geometric configuration of the aperture in the work station top surface. For example, the support member portion is cylindrically shaped and the aperture has a circular cross-section. It is within the scope of the present invention for the support member portion to have any geometric configuration that can be received within the work station aperture, for example, a support member with a rectilinear or hexagonal cross-section in an aperture having a circular cross-section.

Additionally, the support member is configured or arranged so the support member has relatively limited, if any, transverse motion with respect to opposing surfaces of the aperture. As such, the axis of rotation for the unidirectional rotating member also has limited, if any, motion transverse to and/or along the axis or rotation. In particular, the support member and aperture are configured and arranged so that there is one of a slide-fit, snug-fit or interference fit therebetween. Further, the support member and the rotating member support mechanism are configured such that a portion of the unidirectional rotating member is maintained above the work station surface.

The support member also can be configured so as to include an aperture therein, preferably a centrally disposed through aperture, in which is disposed the unidirectional rotating member. A portion of the rotating member support mechanism extends into the support member aperture so the unidirectional rotating member is rotatably disposed from this support mechanism portion.

Other aspects and embodiments of the invention are discussed below.

BRIEF DESCRIPTION OF THE DRAWING

For a fuller understanding of the nature and desired objects of the present invention, reference is made to the following detailed description taken in conjunction with the accompanying drawing figures wherein like reference characters denote corresponding parts throughout the several views and wherein:

FIGS. 7C–E are various views of another alternative embodiment of a wheeled unidirectional rotating support assembly;

FIG. 7F is an end view of the wheeled unidirectional rotating support assembly embodiment illustrated in FIGS. 7C–E further configured with a bridge member;

FIG. 7G is a top view of the wheeled unidirectional rotating support assembly embodiment illustrated in FIGS. 7C–E with a support member having a different geometric arrangement;

FIGS. 13A–C are top, side and end views respectively of one embodiment of a wheeled unidirectional rotating support assembly, and in FIG. 13C the hidden lines for the bosses/pins are removed for clarity;

FIGS. 13D–F are top, side and end views respectively of another embodiment of a wheeled unidirectional rotating support assembly;

FIGS. 13G–I are top, side and end views respectively of yet another embodiment of a wheeled unidirectional rotating support assembly;

FIGS. 15A–C are top, side and end views respectively of the unidirectional rotating support assembly of FIGS. 14A–B;

FIGS. 19A,B are schematic side and end views respectively of an alternative axle for a unidirectional rotating support assembly;

FIGS. 19C–E are various views or screw-type axle for a uni-directional rotating support assembly; and FIGS. 20A–B are a side and cross-section view of an support member including a detent member for rotatably securing a unidirectional rotating member.

DESCRIPTION OF THE PREFERRED EMBODIMENT

Figure 3A:
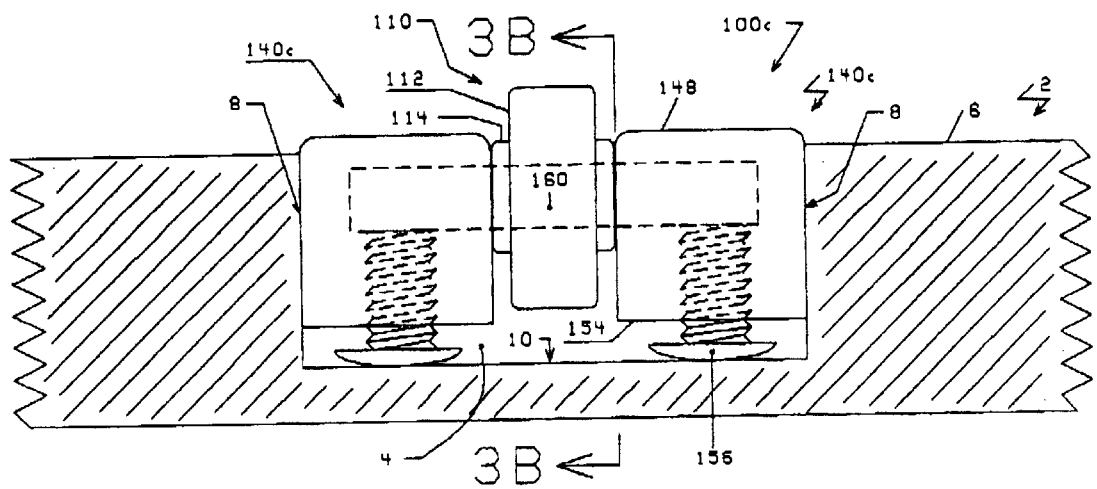
FIG. 3A is another cross-sectional view of the work station of FIG. 1 taken through line 2A—2A which includes another embodiment of a wheeled unidirectional rotating support assembly.
Figure 3B:
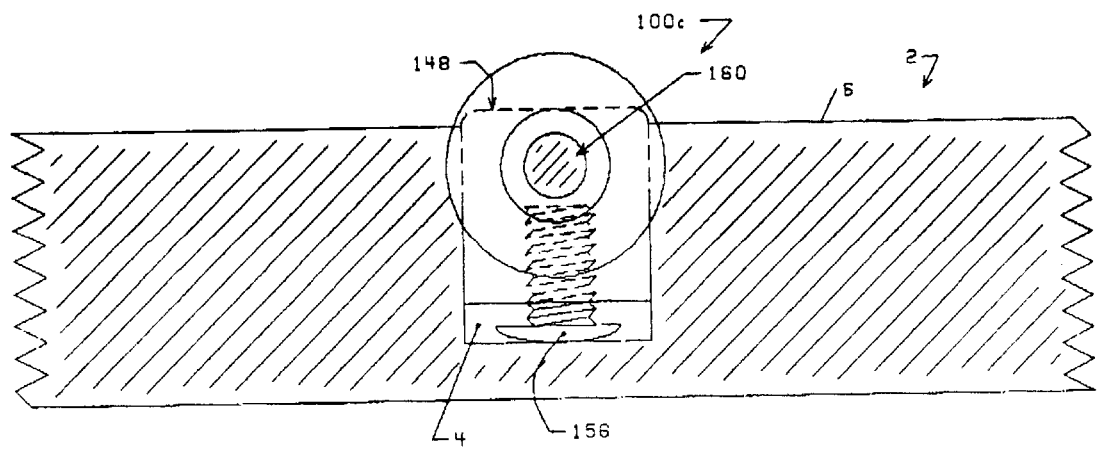
FIG. 3B is a cross-sectional view of FIG. 3A taken through line 3B—3B.
Figure 3C:
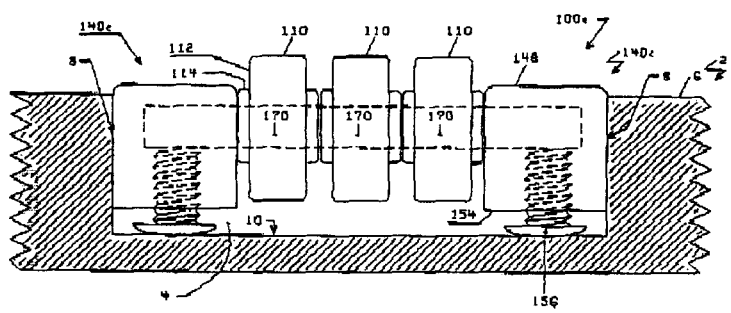
FIG. 3C is another cross-sectional view of the work station of FIG. 1 taken through line 2A—2A including the wheeled unidirectional rotating support assembly of FIG. 3A configured with a plurality or more of wheels.
Figure 4C:
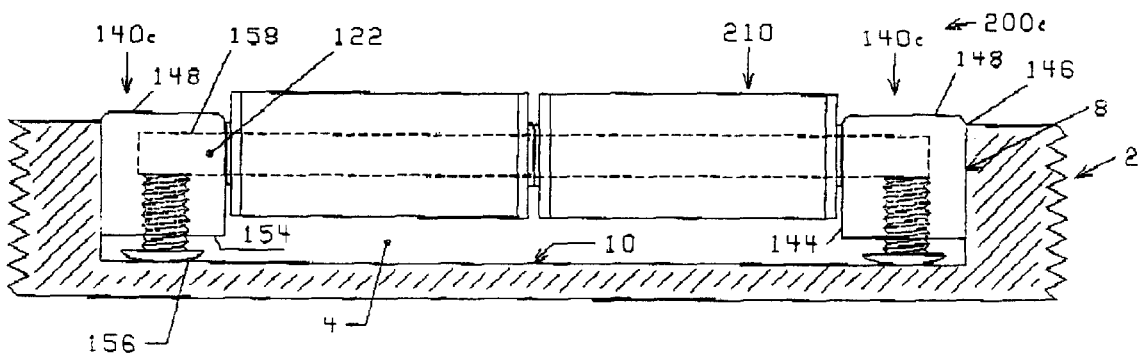
FIG. 4C is another cross-sectional view of the work station of FIG. 1 taken through line 4A—4A including the roller uni-directional rotating support assembly of FIG. 4A configured with a plurality or more of rollers.
Figure 4A:
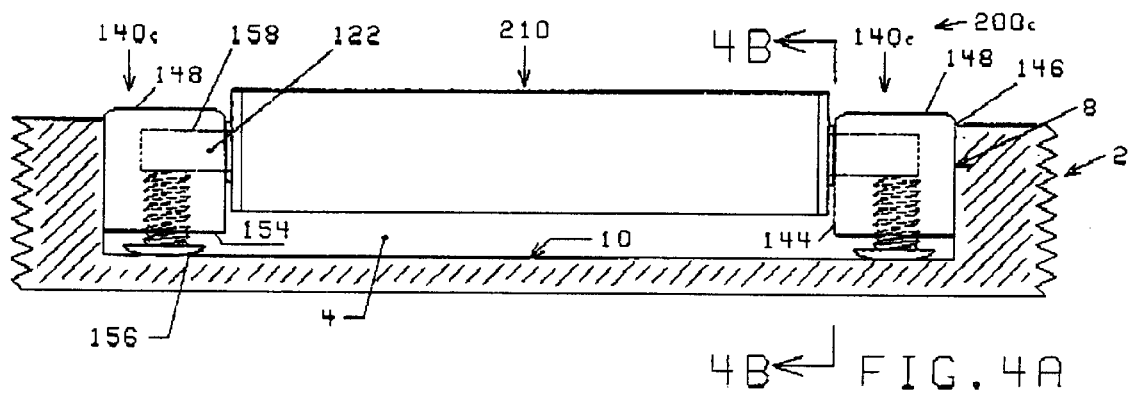
FIG. 4A is a cross-sectional view of the work station of FIG. 1 taken through line 4A—4A including one embodiment of a roller unidirectional rotating support assembly.
Figure 4B:
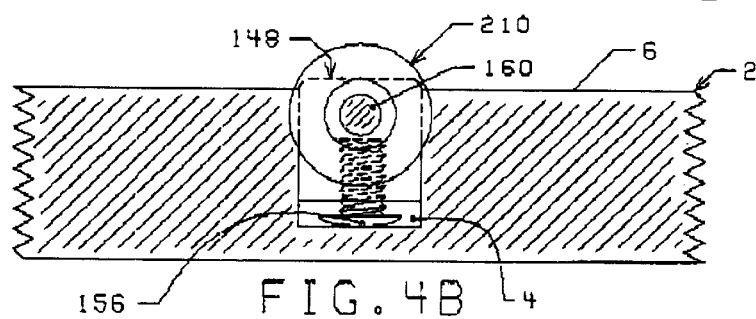
FIG. 4B is a cross sectional view of the roller unidirectional rotating support assembly of FIG. 4A taken through line 4B—4B thereof.

Referring now to the various figures of the drawing wherein like reference characters refer to like parts, there is shown in FIGS. 1–10 various views of unidirectional rotating support assemblies according to a first aspect of the present invention that are disposed in the top surface 6 of a work station 2. In particular, various exemplary embodiments of a wheeled unidirectional rotating assembly are shown in FIGS. 1–3 and 7; various exemplary embodiments of a roller unidirectional rotating assembly are shown in FIGS. 1, 4 and 8; and various embodiments of the support member of a unidirectional rotating assembly according to the first aspect, are shown in FIGS. 5–6 and 9–10.

The illustrated work station 2 includes a relatively flat surface as the top surface 6 with a plurality of apertures formed, machined or otherwise provided therein. In an exemplary embodiment, the work station 2 is formed from a wooden board or panel, including for example plywood, particle board, medium density fiberboard (MDF), or oriented strand board (OSB), which is provided with a hard surface coating comprising the top surface 6. The hard surface coating is any of a number of materials known in the art for use as a surfacing material, including plastic laminates such as melamine, hardboard such as masonite or sheet metal, that is applied or affixed to an underlayment or underlying layer, such as particle board, OSB, or MDF. Alternatively, the solid wooden surface of the wooden board or panel comprises the top surface 6 of the work station 2. It should be recognized that it is within the scope of the present invention for the work station to be made using any of a number of materials and techniques known to those skilled in the art including plastics and metals and thus the present invention shall not be limited to the exemplary and illustrative work station embodiments described herein.

Figure 1A:
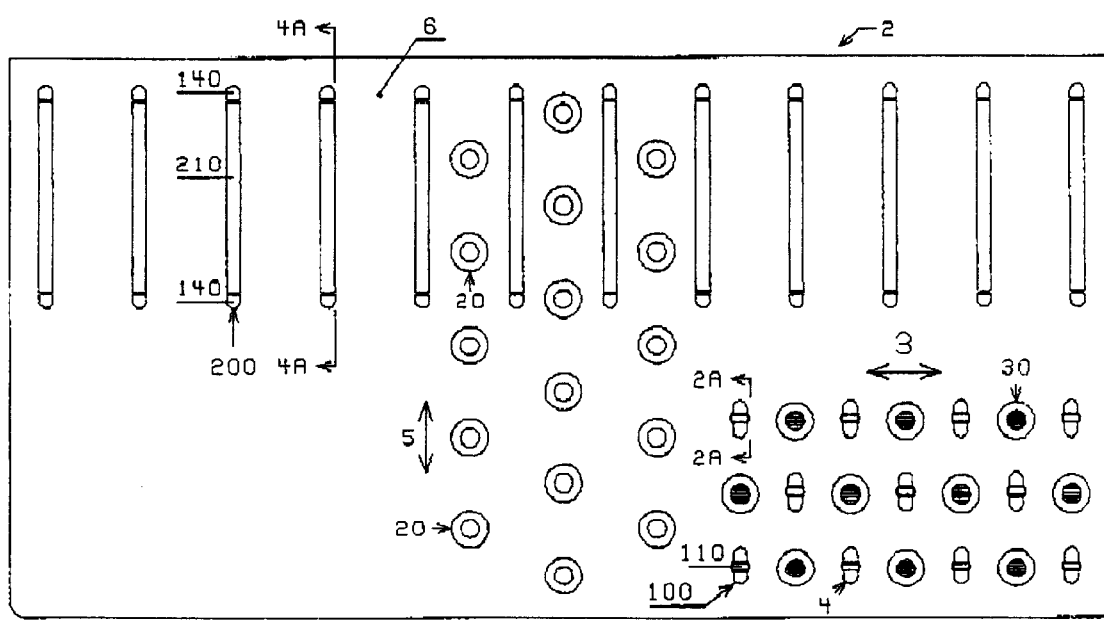
FIG. 1A is a plan view of a work station including therein a plurality of unidirectional rotating support assemblies according to a first aspect of the present invention.
Figure 1B:
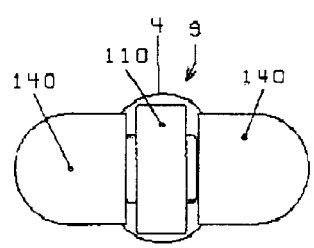
FIG. 1B is an enlarged view of FIG. 1A proximal an aperture in the work station top surface including therein a wheeled unidirectional rotating support assembly.
Figure 11:
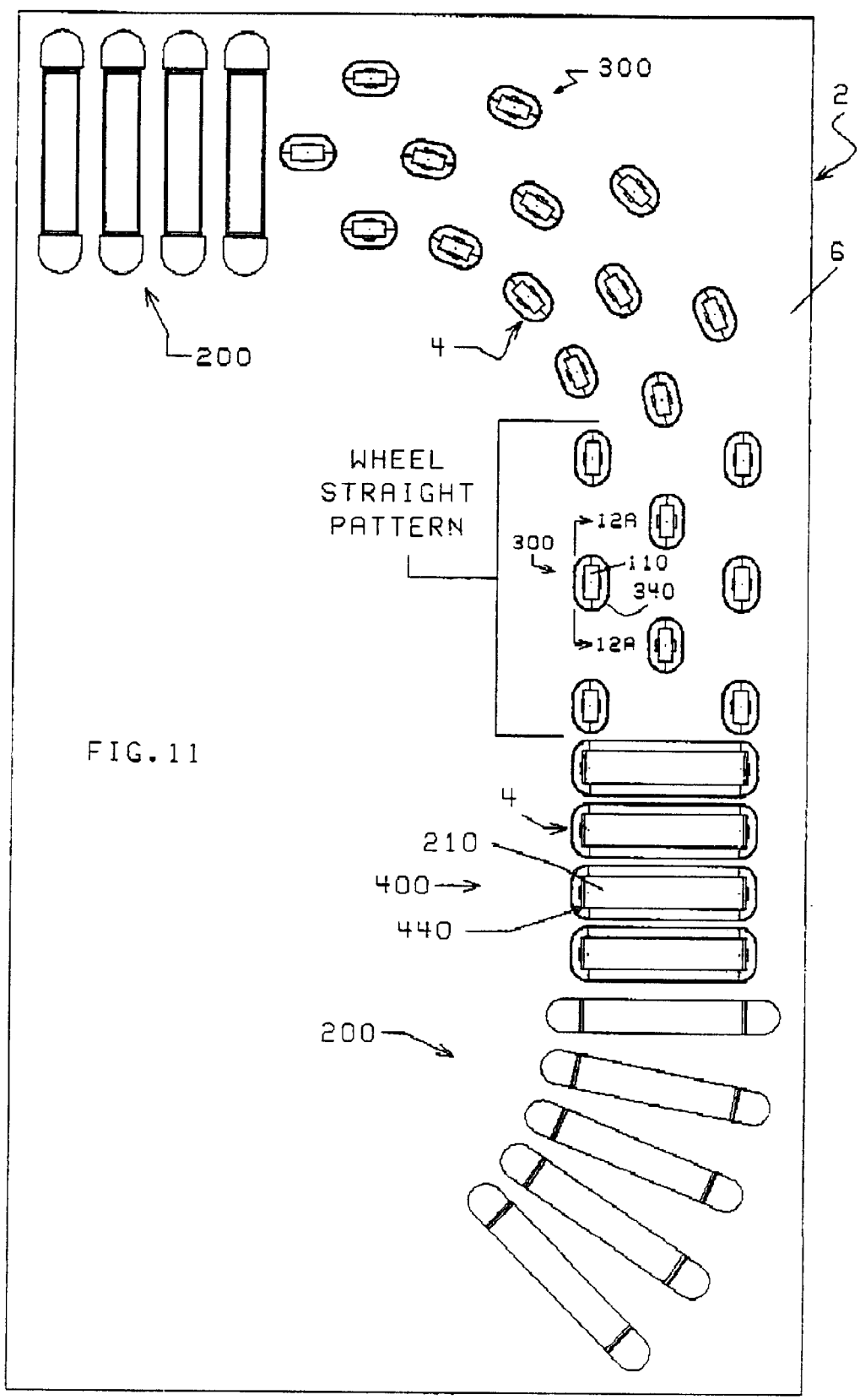
FIG. 11 is a plan view of a work station including therein a plurality of unidirectional rotating support assemblies according to a second aspect of the present invention as well as other support assemblies.

Before describing the various unidirectional rotating support assembly embodiments according to a first aspect of the present invention, the flow of articles along the top surface 6 of the exemplary work station 2 is first briefly described. It should be recognized that the following and FIGS. 1A–1B are only illustrative of an exemplary configuration or arrangement for unidirectional rotating support assemblies. It is within the scope of the present invention, however, for any of the unidirectional rotating support assemblies according to the present invention to be arranged and combined in any of a number of ways, including the other exemplary arrangement that is shown in FIG. 11. As also shown in FIG. 1A, the unidirectional rotating support assemblies of the present invention can be combined for use with other types of devices known to those skilled in the art including, but not limited to, pop-up ball assemblies, retractable ball transfer assemblies, omni-directional ball transfers and pop-up pad assemblies, such as those manufactured and sold by the OMTEC Corporation, and other components in the material handling field (e.g. conveyor bed sections).

In the illustrated work station 2, the roller unidirectional rotating support assemblies 200 are arranged so as to form a travel lane upon which articles can travel across the width of the work station top surface 6. In use, the article is conveyed along the rotating rollers 210 of the roller support assemblies 200. If the article is to be worked on at the work station 2, when the article is moved over the rollers 210 so that it is generally located over the pop-balls 20 the worker actuates the pop-up balls so as to lift the article clear of the top of the rollers 210. The worker then moves the article in a directionS at an angle (e.g., perpendicular) to the conveying travel direction 3 until the article is properly positioned for further work by the worker. Because pop-up balls 20 are typically arranged so as to be moveable or rotatable in more than one direction, a worker can rotate the article with respect to the top surface 6.

Thereafter the worker de-actuates the pop-up balls 20 so the article rests upon the work station top surface 6, thereby positioning the article so the specific task to be performed at the work station can be performed by the worker. After completing the task, the worker again actuates the pop-up balls 20 to lift the article off the top surface 6 and the worker moves the article back along the pop-up balls 20 so the article is positioned back in line with the roller unidirectional rotating support assemblies 200. Thereafter, the worker de-actuates the pop-up balls 20 so the article again rests upon the rollers 210. The article is then conveyed along the rollers 220 in the conveying travel direction 3.

In the illustrated work station 2, the wheeled unidirectional rotating support assemblies 100 are arranged so as to form a second travel lane in which the articles are conveyed along the rotating wheels 110 in another conveying travel direction 3. When the article is moved so that is generally disposed over the pop-up pads 30, the worker can actuate the pop-up pads so as to raise the article above the wheels 110 and thus support the article upon the pads. While the pop-pads 30 are in the elevated position, the worker typically performs the specified task. After performing the task, the user lowers the pads 30 so the article again rests upon the wheels 110. The worker also would elevate the pop-balls 20 so they can receive the article being conveyed along the wheeled unidirectional rotating support assemblies to the pop-balls 20. Thereafter, the worker transfers the article using the pop balls 20 to the rollers 210 in the same fashion as described above for the roller unidirectional rotating support assemblies 200.

As to the details of the work station 2 and the wheeled and roller unidirectional rotating support assemblies 100,200 according to the first aspect, the apertures 4 formed or otherwise provided in the work station top surface 6, as illustrated in FIG. 1A, generally are elongated slots having a length and specific shape that complements the kind and size of the unidirectional rotating support assembly disposed therein. For example, the elongated slot for a roller support assembly 200 typically would be longer as compared to the elongated slot for a wheeled support assembly 100. The elongated slots comprising the apertures 4 also have a width that is generally sufficient so as not to impede the rotation of the unidirectional rotating member, wheel 110 or roller 210, disposed within the aperture. The width of the elongated slot at the opposing ends 8 of each aperture 4 also is set to limit the motion of the support member 140 disposed thereat, which width can be different (e.g., narrower or wider) from the width of the elongated slot proximal the unidirectional rotating member.

As illustrated in FIG. 1B, the work station aperture 4 can be configured with a local depression or cutout 9 on opposing sides of the aperture. The cutout 9 or depression is provided so there is additional space or open area provided proximal the unidirectional rotating member (e.g., wheel 110) so the aperture walls do not impede the rotation of the rotating member. This is particularly advantageous for wheeled unidirectional rotating assemblies whose wheels 110 typically extend perpendicular to the slot long axis beyond the support members 140 for a relatively short distance along this axis as compared to the overall length of the elongated slot. In this way, the aperture 4 is configured to provide an open area that is sufficient for rotation of the unidirectional rotating member while minimizing the overall size of the aperture 4 provided in the top surface 6 of the work station 2. Minimizing the overall size of the work station aperture 4 is advantageous from the standpoint of the load capacity of the work station 2 as well as reducing the open area in which material or debris can be collected so as to minimize the potential for jamming of the rotating member. This also leaves more unobstructed work surface area and reduces human finger pinch points and product catch points (e.g. flaps and trailers on corrugated boxes).

Although the apertures 4 are illustrated as being elongated slots having arcuate surfaces at the opposing ends 8, this is not a limitation. It is within the scope of the present invention for the apertures 4 to be configured so as to have a cross-section of any geometric shape, including apertures having a circular, rectilinear, triangular, octogonal, hexagonal or other polygonal shape. Additionally, the top surface 6 can be configured with apertures 4 having the same cross-section or apertures having different cross-sections (e.g., circular and rectilinear).

In FIGS. 1A,B reference numerals 100,200 are used to generally identify respectively, a wheeled and roller unidirectional rotating support assembly, and reference numeral 140 is used to generally identify each support member of each said assembly. In the following discussion, when reference is being made to a specific embodiment of the unidirectional rotating support assemblies and/or support member, each of these reference numerals will further include an alpha character (e.g., 100*a,* 140*a*) so as to uniquely identify the embodiment being particularly described. When reference is made to one of reference numerals 100, 140, or 200, however, then it shall be understood that reference is being made in general to one of the wheeled or roller unidirectional rotating support assembly or the support member according to the first aspect of the present invention.

As provided above, FIGS. 1–4 and 7–8 show various embodiments of wheeled and roller unidirectional rotating support assemblies 100, 200 according to the first aspect of the present invention. The wheeled and roller support assemblies of the first aspect invention, as well as any other unidirectional rotating support assemblies of the present invention, are configured and arranged so they can be disposed in one of a plurality of apertures 4 provided in the top surface 6 of the work station 2.

Now referring specifically to FIGS. 1–3 and 7 there is shown various embodiments of a wheeled unidirectional rotating support assembly 100. Each wheeled unidirectional rotating support assembly includes a wheel 110, two support members 140 and a mechanism by which the wheel is rotatably supported from the support members. The support members 140 according to the present invention are made from any of a number of materials known to those skilled in the art which can withstand the normal operational loadings. These materials include plastics such as high density polyethylene, delrin, polypropylene and ABS and a wide range of metals, including steel, aluminum, and brass using any of a number of manufacturing techniques known to those skilled in the art.

In the illustrated embodiments, the wheel is configured so as to include a hub 114, having an aperture 116, and a rotating part 112. The hub 114 is typically and rotatably interconnected to the rotating part 112 by a bearing system, bushing, or the like, whereby the rotating part can rotate about the hub with little or no friction in the unloaded condition. The wheel 110, however, shall be any wheel known to those skilled in the art which can be used with the support members herein described to rotatably support an article passing thereover. Reference also should be made to FIGS. 19A–H and 21A–D and the discussion thereto for further details regarding exemplary wheels and/or components thereof useable with the wheeled unidirectional rotating support assembly of the present invention.

Figure 2A:
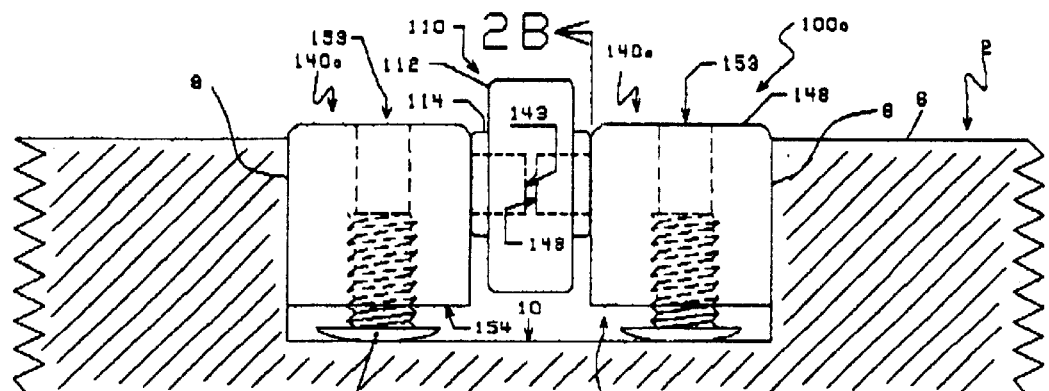
FIG. 2A is a cross-sectional view of the work station of FIG. 1 taken through line 2A—2A including one embodiment of a wheeled unidirectional rotating support assembly thereof.
Figure 2B:
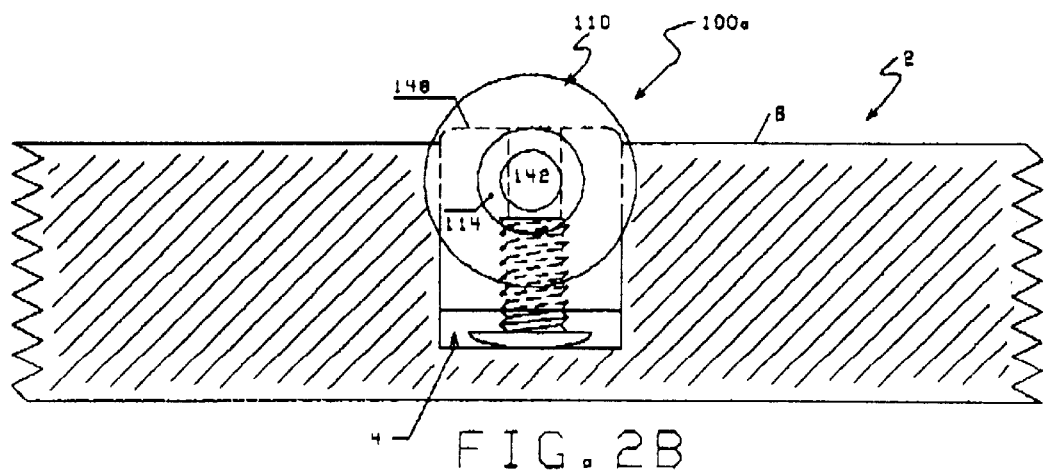
FIG. 2B is a cross-sectional view of FIG. 2A taken through line 2B—2B.

There is shown in FIGS. 2A,B one embodiment of a wheeled unidirectional rotating support assembly 100a that includes a wheel 110 and two support members 140a that are particularly configured to rotatably support the wheel 110. In particular, and with reference also to FIGS. 5D–F, each support member 140a includes a projecting member 142 that projects from a distal end 144 of the support member and is received within the hub through aperture 116.

In one illustrative embodiment, the length of the projecting member 142 that projects outward from the support member distal end 144 is established, as shown more clearly in FIG. 2A, so the ends 143 of the projecting members for the support members 140a are spaced from each other when the wheeled unidirectional rotating support assembly 100a is located in a work station through aperture 4. The length of each projecting member 142 also is established so that the projecting members rotatably supporting a wheel 110 are capable of withstanding the loads being imposed by the article rotatable supported by the wheel 110. It should be recognized that it is within the scope of the present invention for the projecting member ends 143 to contact each other when in the assembled configuration.

Although the projecting member 142 is illustrated as being generally cylindrical in shape, such as a rod or pin-like member, this is not a limitation as the projecting member can have any geometric shape, such as a tapered or cone shape, that would otherwise be consistent with the capability of rotatable support for the wheel 110. There also is shown in FIGS. 2C–D a splined projecting member 142a, in which the member is configured so as to be in the form of a spline or star. Preferably, the tips, the teeth, tooth or parallel keys forming the splined projecting member 142a can deform. In this way if the maximum outer diameter of the teeth is greater than the inner diameter of the hub aperture 116, the tips will allow the splined projecting member to adjust to accommodate the smaller diameters of the hub aperture.

Figure 2E:
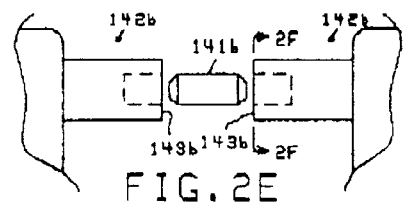
FIG. 2E is an exploded view, similar to FIG. 2A, showing a mechanical couplable projecting embodiment with the wheel removed for clarity.
Figure 2F:
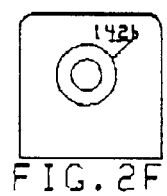
FIG. 2F is an end view of one projecting member of FIG. 2E taken along line 2F—2F.
Figure 2G:
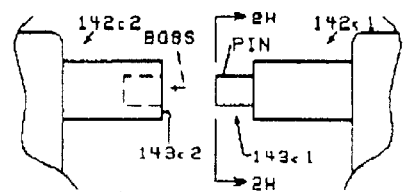
FIG. 2G is an exploded view, similar to FIG. 2A, showing another mechanical couplable projecting member embodiment with the wheel removed for clarity.
Figure 2H:
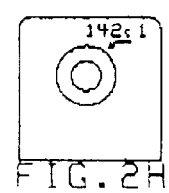
FIG. 2H is an end view of one projecting member of FIG. 2G taken along line 2H—2H.
Figure 2C:
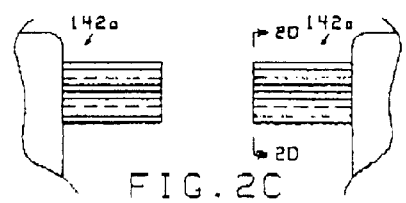
FIG. 2C is an exploded view, similar to FIG. 2A, showing an alternative projecting member embodiment with the wheel removed for clarity.
Figure 2D:
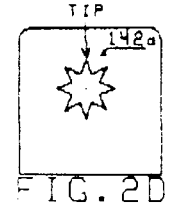
FIG. 2D is an end view of the projecting member of FIG. 2D taken along line 2E—2E.

There is shown in FIGS. 2E–2H, two alternative techniques for mechanically coupling opposing projecting members of the support members comprising a unidirectional rotating support assembly according to the present invention. In FIGS. 2E–F, there is shown a projecting member 142b that is configured with a boss or blind hole in the end 143b of the projecting member. A dowel 141b, or other such structural member, is inserted into the blind holes provided in both projecting member ends 143b, when the unidirectional rotating support assembly is in its assembled state, so as to mechanically couple the projecting members 142b and so as to further strengthen the mechanical support for the wheel 110. The dowels and/or bosses also can be configured with divots on the end so they snap into each other.

The foregoing is illustrative of a few techniques that can be used to rotatably support the wheel, and as such, it is within the scope of the present invention for other techniques known in the art be adapted for use with the support member 140 of the present invention. For example, and as illustrated in FIGS. 20A–B, the support member distal end 144 for any of the support members described herein is arranged so as to include a detent member 145. The detent member 145 is a spring like member, a portion of which projects outwardly from the support member distal end.

In the illustrated embodiment, a part of this projecting portion is generally hemispherical in shape and sized so as to be capable of being received in the hub aperture 116. In this way, the wheel 110 is rotatably supported by the projecting portions of the detent members 145 for the opposing support members when the wheel is disposed between the opposing support members 140a.

Each support member 140a includes a top surface 148, sides 150 and a proximal end 146 that is generally opposite to the distal end 144 and which generally abuts or is proximal the inside surface of the work station aperture 4, when the support member is disposed therein. The sides 150 and the proximal end 146 are configured and sized so that each support member 140a has limited to no play or motion within the work station aperture 4 when the two support members 140 and the wheel 110, rotatably supported therefrom, are disposed in the work station aperture. In an illustrative embodiment, the portion of the hub 114 on either side of the wheel 110 is proximal the distal end 144 of the support member 140a so as to limit axial play or motion. In this way, the axis of rotation for the wheel 110 is generally fixed with respect to the work station aperture 4 so there is limited to no motion of the wheel 110 transverse to and/or along the axis of rotation. Thus, an article passing across the work station top surface 6 and being rotatably supported by one or more wheeled unidirectional rotating support assemblies 100a should not cause the corresponding support member(s) 140a in the top surface to be moved laterally or longitudinally within the work station aperture 4.

The sides 150 and the proximal end 146 are configured and sized so that the support member 140a is slidably received in the opposing end 8 of the work station aperture 4. That is, a slide-fit is established between the inside surfaces of the aperture 4 at each opposing end 8 and the outside surfaces of the support member proximal end 146 and the sides 150. Alternatively, the abutting or proximal end 146 and the sides 150 are configured and sized so there is a snug-fit or an interference fit established therebetween.

In the illustrative embodiment, the top surface 148 of the support member 140a forms a truncated oval shape. In this arrangement, the proximal end 146 of the support member 140a is arcuate, the distal end, excluding the projecting member 142 is generally perpendicular to a long axis of the support member and the sides 150 are generally parallel to the support member long axis. With such an arrangement, and as illustrated in FIGS. 1A–B, each support member 140a is configured so as to generally conform to the general configuration of the opposing ends 8 of the aperture 4 in the work station top surface 6. Although the support member top surface 148 is illustrated as being a flat surface this is not a limitation for it is within the scope of the present invention for the top surface to have any geometric shape projecting upwardly from the work station top surface 6. Such a surface configuration can be for cosmetic and/or functional purposes. For example, the support member top surface 148 for either or both of the support members 140a comprising the wheels unidirectional rotating support assembly to be a sloping surface that pitches away from the wheel 110. In this way, a worker could push on an item or article so it travels up the slope, thereby guiding the article onto the wheel 110. The foregoing also applies to any wheeled or roller unidirectional rotating support assemblies of the present invention.

It is within the scope of the present invention for the support members 140 of the present invention to be configured so as to have any geometric configuration that can be disposed within the opposing ends 8 of the work station aperture 4 and which can limit or preclude motion of the support member with respect to the opposing end as herein described. For example, the support member proximal end 146 and the sides 150 can be arranged so as to form a portion of a triangle, rectangle, hexagon, or other polygon shapes, portions of which (e.g., the edges or corners) contact or are proximal the arcuate opposing surfaces of the opposing end 8 thereby limiting motion along and/or transverse to the axis of rotation.

Although the foregoing describes the support member 140a as being configured or arranged so as to be disposed within the opposing ends 8 of a work station aperture 4, this shall not be interpreted as being a limitation. It is within the scope of 110 the present invention, and preferable, for the support members 140a to be provided with a predetermined geometric configuration and size. In this case, the opposing ends 8 are formed or machined in the top surface to receive this pre-configured support member and so as to limit the motion of the support member when it is disposed in the opposing end as herein described.

The support member 140 can further include a mechanism that adjusts the position of the axis of rotation for the wheel 110 or the centerline defined by the projecting members 142 of the two support members 140a, with respect to the bottom of the work station aperture 4 and thus also with respect to the work station top surface 6. Alternatively, the work station aperture 4 can be formed or machined so the aperture bottom 10 is a predetermined distance from the work station top surface 6. In this case, when the wheeled unidirectional rotating support assembly 100a is disposed in the aperture 4, the bottom surface 154 of the support member 140a rests upon the aperture bottom. The predetermined distance is set so that the axis of rotation for the wheel 110 is at a desired position with respect to the work station top surface 6 when the support member bottom surface 154 is resting on the aperture bottom 10. It also is within the scope of the present invention for each support member 140a to be configured with a plurality or more of projecting members 142 or axle receiving aperture 158 that are spaced vertically from each other. Thus, the adjustment of the position of the axis of rotation with respect to the aperture bottom 10 and the work station top surface can be accomplished by selecting one of the projecting members 142 of the pair of support members 140 or by selecting one of the axle receiving apertures 158 of the pair of support members and disposing the axle 170 therein.

Figure 5A:
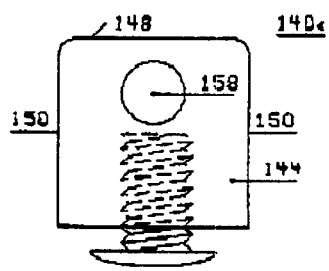
FIGS. 5A–F are various views of a support members of unidirectional rotating support assemblies of the present invention.
Figure 5B:
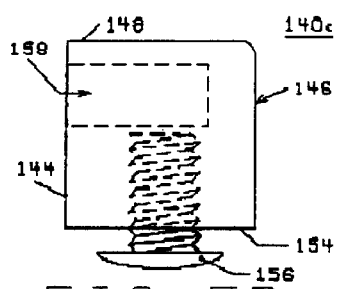
Figure 5C:
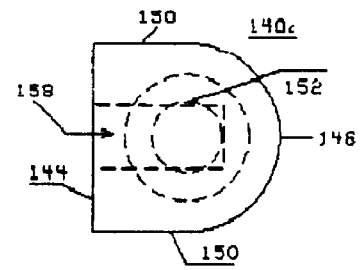
Figure 5D:
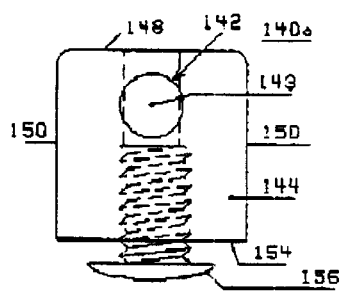
Figure 5E:
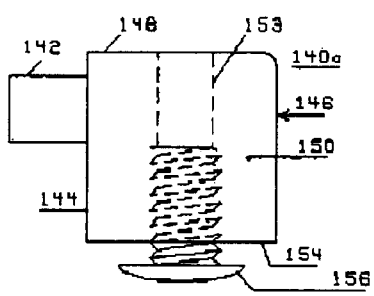
Figure 5F:
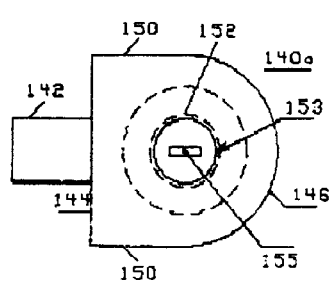

In an exemplary embodiment, and as shown in FIGS. 2A,B and FIGS. 5D–F, the height adjusting mechanism for the support member 140 comprises an aperture 152 in the bottom surface 154 of the support member 140a and an extension member 156. A portion of the extension member 156 is securely disposed within the bottom surface aperture 152 and another portion of the extension member extends outwardly or downwardly from the support member bottom surface 154. As shown more clearly in FIGS. 2A–B, when the support members 140a are disposed in the aperture opposing ends 8, an end or head of the extension member 156 rests upon the aperture bottom 10 so the support member bottom surface 154 is disposed a distance thereabove. Thus, by adjusting the exposed length of the extension member 156, the distance between the axis of rotation and the work station aperture bottom 10 is thereby adjusted and controlled.

The end of the extension member 156 can be further configured so as to distribute the point loading over a wide area and/or the aperture bottom 10 can be configured so as to be capable of carrying the loading being distributed (e.g., point loading) by each of the extension member ends. Also, while a blind hole having a bottom is illustrated (e.g. see FIGS. 2A,B), it is within the scope of the present invention for a through hole to be machined or otherwise formed in the work station 2 and for a member, a portion of which projects into the through aperture is secured to 1 back surface of the work station: In this case, the projection portion in effect forms the aperture bottom 10.

Preferably, the bottom surface aperture 152 is a threaded aperture and the extension member 156 is threadably received therein. Thus, by rotating the extension member 156 in either of a clockwise or counterclockwise direction, the exposed length of the extension member extending from the bottom surface 154 of the support member 140a is thereby increased or decreased. This, thereby adjusts the distance between the support member bottom surface 154 and the aperture bottom 10 and thus, also adjusts the position or location of the axis of rotation with respect to the work station top surface 6.

The support member 140b can be further configured so as to have a top surface aperture 153 in the support member top surface 148, which extends from the top surface to the cavity within the support member defined by the bottom surface aperture 152. Additionally an end 155 of the extension member 156 can be configured so as to include a slot or other surface artifact known to those skilled in the art by which a slotted screw driver, phillips head screw driver, square headed screw driver, hex wrench or the like can mechanically engage the surface artifact so the extension member can be selectively rotated in either a counterclockwise or clockwise direction.

Alternatively, different length extension members 156 can be provided and inserted into the bottom surface aperture 152. By thus controlling and adjusting the overall length of the extension member 156, the exposed length of the extension member and the distance between the support member bottom surface 154 and the aperture bottom 10 also is controlled and adjusted thereby. Thus, to establish a given exposed length, one would insert an extension member into the bottom surface aperture 152 that has a length that will yield the desired exposed length following insertion.

The foregoing adjustment to the position of the axis of rotation, also controls and adjusts how much above the work station top surface 6 a portion of the wheel 110 will project. Thus, if a greater exposure of the wheel 10 is desired, the exposed length of the extension member 156 for each support member 140a is increased so as to raise the axis of rotation. This height-adjusting capability provides a mechanism to adjust the height of the wheel 110 so that the wheels and any other article transport, such as components (pop-up balls 20), the work station 2 is configured with are at the same height for transporting articles. Additionally, this provides a mechanism for adjusting the height so the wheels 110 are at a height lower than the pop-up balls 20 when the balls are raised to pick up an article off the wheels. The foregoing height adjustment capability also applies to the below described roller 210 of any of a roller unidirectional rotating support assembly 210.

The capability to adjust the position of the axis of rotation also provides a mechanism by which a wheeled unidirectional rotating support assembly 100a can be adapted for use with wheels 110 having different diameters. In this way, a support member 140a having a common configuration or arrangement can be used to rotatably support a wide range of wheel diameters.

The above-described wheeled unidirectional rotating support assembly 100a is advantageously configured and arranged to at least limit the motion of this assembly transverse to and along the axis or rotation (i.e., in all three axes) when this assembly is disposed with a work station aperture 4. In particular, the support member 140a and the work station aperture 4 are each configured and arranged so there is limited to no motion transverse to and along the axis of rotation. Additionally, the wheeled unidirectional rotating support assembly 100a can include a mechanism that allows the axis of rotation for the wheel 110 to be raised or lowered with respect to the work station top surface 6, thereby controlling how high above the work station top surface a portion of the wheel will project.

Figure 6A:
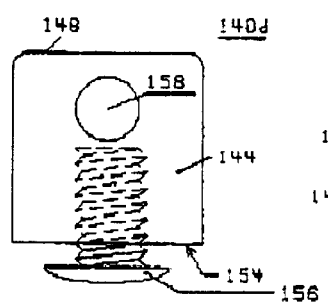
FIGS. 6A–F are various views of a support members having a different geometric shape than shown in FIGS. 5A–F.
Figure 6B:
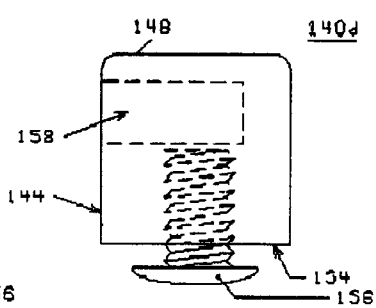
Figure 6C:
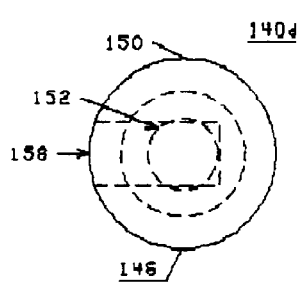
Figure 6D:
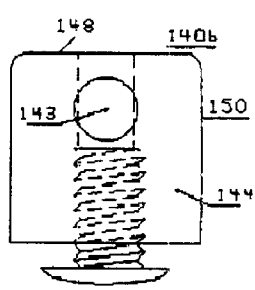
Figure 6E:
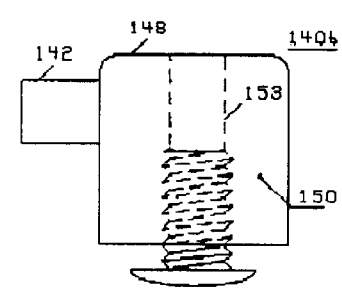
Figure 6F:
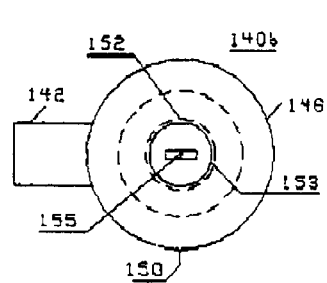

There is shown in FIGS. 6D–F another support member 140b that is similar to the support member 140a shown in FIGS. 5D–F except for the particular geometric configuration. In this illustrative embodiment, the top surface 148 of the support member 140b forms a circular shape but it also can be truncated circular shape. In this arrangement, the distal and proximal ends 144,146 as well as the sides 150 are arcuate and generally are concentrically formed about a common axis generally perpendicular to the top surface 148. In this case the opposing ends 8 of the aperture 4 in the work station top surface 6 would have a complementary configuration to that of the support members 140b. As to other details of this support member 140b, reference should be made to the foregoing discussion regarding FIGS. 5D–F.

There is shown in FIGS. 3A,B another embodiment of a wheeled unidirectional rotating support assembly 100c that includes a wheel 110, two support members 140c and an axle 170, where the wheel is disposed about and rotatably supported by the axle. The axle 170 extends between, and is supported by, the two support members 140c. This embodiment, has some features in common with those described above in connection with FIGS. 2A,B, 5D–F and 6D–F, accordingly reference shall be made to the foregoing discussion regarding these figures for related details not described more particularly below.

In this embodiment, and referring now also to FIGS. 5A–C, the distal end 144 of the support member 140c includes an aperture 158 therein for receiving an end of the axle 170. In a specific embodiment, the axle receiving aperture 158 is sized and configured so the fit between the axle end and the interior of the aperture is such that the axle end remains secured within the axle receiving aperture and is generally resistant to normal loads and forces in the axial direction. In a specific embodiment, the axle receiving aperture 158 and the axle end are configured and arranged so there is a snug-fit or interference fit therebetween.

Preferably, the axle 170 is fixed or non-rotating and the wheel 110 disposed thereon, includes a bearing subsystem or other mechanism known to those skilled in the art that allows the wheel to rotate relatively freely or with little friction in the unloaded state about the axle. Alternatively, the wheel 110 is secured to the axle 170 and any of a number of mechanisms or methods known to those skilled in the art is provided to allow the axle to rotate with respect to each of the support members 140c. For example, each support member 140c could be made of a bearing quality plastic such as high quality polyethylene, or a bushing quality metal such as brass. In this way, the axle 170, or a shaft fixed in the wheels 110, can rotate in the axle receiving aperture 158 of the support members 140c.

As indicated above, the wheel 110, typically includes a rotating part 112 and a hub 114 that is rotatably interconnected to the rotating part by a bearing system or the like, which allows the rotating part to rotate about the hub with little or no friction in the un-loaded condition. In the illustrated embodiment, the axle 170 is received in the hub through aperture 116. As indicated above, however, the axle 170 also can be in the configuration of a spline, so the axle can accommodate variations in the diameter of the hub through aperture 116 and be securably received in the hub through aperture 116.

As noted above, the support member 140c of the present embodiment can have any geometric configuration that can result in the wheeled unidirectional rotating support assembly 100c of the present embodiment having little to no motion along and transverse to the axis of rotation of the wheel 110. In particular, and as shown in FIGS. 6A–C, a support member 140d can be configured similar to FIGS. 5A–C but having a top surface 148 in the form of a circle (FIGS. 6A–6C) or a truncated circle.

Additionally, the support member 140c can further include a mechanism to adjust the position of the axis of rotation for the wheel 110, or the centerline defined by the axle 170 and the support member axle receiving apertures 158, with respect to the aperture bottom 10 and the work station top surface 6. Reference shall be made to the foregoing discussion regarding FIGS. 2A,B for further details regarding the specifics of the adjusting mechanism. Also and as further described above in connection with FIGS. 2A,B, each support member 140c can be configured with a top surface aperture 153 (FIGS. 5E,F) so a user can insert an implement or device into the top surface aperture. The implement or device can be used to rotate the extension member 156 in a clockwise or counterclockwise direction so the user can adjust the length of the exposed length of the extension member 156.

In specific embodiments, the axle 170 is a solid cylindrical member or a tubular member of a metal such as brass or steel, a plastic or other material known in the art for such an application. Alternatively, and with reference to FIGS. 19A–B, an axle 170a can be used that is configured so it is axially adjustable. Such an axially adjustable axle 170a comprises two tubular members 172a,b one end of each being sealed or closed and each being of a different diameter. The tubular members 172a,b are concentrically disposed such that one tubular member 172a is slidably disposed along the outer surface of the other tubular member 172b. Alternatively, the tubular members are of the same diameter, each having a length short enough so they can be compressed for insertion but long enough to perform the supporting function. A spring 174 is disposed in the cavity formed by the concentrically disposed tubular members 172a,b so it acts on the sealed ends of the tubular members 172a,b. The spring 174 allows the concentrically disposed axle tubular members 172a,b to be compressed axially and which also biases the sealed ends of the tubular member away from each other.

There is shown in FIG. 3C an alternative embodiment of a wheeled unidirectional rotating support assembly 100c' that is configured with a plurality or more of wheels 110, two support members 140c and an axle 170, where each of the wheels is disposed about and rotatably supported by the axle. Reference shall be made to the foregoing discussion for FIGS. 3A,B regarding the details of the wheels 110, the support members 140c and the axle 170 making up this alternative embodiment.

Such a wheeled unidirectional rotating support assembly 100c having a plurality or more of wheels 110 can be used instead of a roller unidirectional support assembly 200, particularly when the transport is arranged such that the article in transit follows an arcuate path. Multiple separate wheels on a axle can each rotate at different rate of rotation, thus providing a mechanism for minimizing the skidding the article as it passes over the wheels on a curved path.

Referring now to FIGS. 1A and 4A,B there is shown one embodiment of a roller unidirectional rotating support assembly 200c according to the first aspect of the present invention. Each of these roller unidirectional rotating support assemblies 200c includes a roller 210 and two support members 140c. Each of the illustrated support members 140c includes an axle receiving aperture 158, as shown in FIG. 5AC and described above, and each roller unidirectional rotating support assembly further includes an axle 170.

The axle 170 extends between the two support members 140c and each end thereof is received in the axle receiving aperture 158 of the corresponding support member 140c. The roller 210 is disposed about and supported by the axle 170. The axle 170 also spaces the support members 140c from each other so each is disposed in an aperture opposing end 8 when the roller support assembly is disposed in a work station aperture 4.

The foregoing is illustrative or exemplary of one embodiment, as the roller 210 of the unidirectional rotating support assembly can be configured or arranged for use with any support member according to the first aspect of the present invention. In particular the roller 210 can be configured for use with the support members 140a–d that are shown in any of FIGS. 5A–F and 6A–F. For example, and with particular reference to FIGS. 17A and FIGS. 5D–F, each end of the roller 210a is configured with an aperture 212 that is sized to received therein the projecting member 142 of a support member 140a. In general, reference should be made to the foregoing discussion regarding the above-described wheeled unidirectional rotating support assemblies 100a–d for details concerning the support member and other features of the support member and corresponding roller unidirectional rotating support assembly not otherwise described herein.

As also illustrated, the support member 140c can further include a mechanism to adjust the position of the axis of rotation for the roller 210, or the centerline defined by the axle 170 and the support member axle receiving apertures 158, with respect to the aperture bottom 10 and the work station top surface 6. Reference shall be made to the foregoing discussion regarding FIGS. 2A,B for further details regarding the details of such an adjusting mechanism. Also and as further described above in connection with FIGS. 2A–B, each support member 140c can be configured with a top surface aperture 153 (FIGS. 5E,F) so a user can insert an implement or device into the top surface aperture. The implement or device can be used to rotate the extension member 156 in a clockwise or counterclockwise direction so the user can adjust the exposed length of the extension member while the roller unidirectional rotating support assembly 200c is disposed within the work station aperture 4.

This adjustment mechanism provides a mechanism to control and adjust how much above the work station top surface 6 a portion of the roller 210 will project. The capability to adjust the position of the axis of rotation also provides a mechanism by which a roller support assembly 200 can be adapted for use with rollers 210 having different diameters. In this way, a support member 140 can be configured and arranged to rotatably support a wide range of roller diameters. Such height adjustability also allows the roller 210 or any other uni-directional rotating members described herein to be adjusted to complement the height for other components being used therewith, for example ball-transfer assemblies and pop-up pad assemblies.

The roller 210 is any one of number of devices known to those skilled in the art which can be used with the support members herein described to rotatably support an article passing thereover. Reference also should be made to FIGS. 18A–D and the discussion thereto for further details regarding exemplary rollers and/or components thereof useable with the roller unidirectional rotating support assembly 200 of the present invention.

The length of the roller 210 is established to fit the given application or use. The length of the roller 210 also is established, with consideration of the diameter and thickness of the tubular member comprising the roller as well as other structural features thereof, so that the roller does not deflect or bend an unacceptable amount responsive to the load imposed thereon. Thus, and depending upon the given application, the roller 210 can be sized so that it extends substantially across the width of the work station top surface 6. Alternatively, a combination of roller support assemblies 200 having different length rollers 210 can be positioned in a side-by-side arrangement across the width of the work station top surface 6. In yet another embodiment, as shown in FIG. 4C, a roller uni-directional rotating support assembly includes a plurality or more rollers 210 that are being rotatably supported on a common axle 170.

For the above-described wheeled and roller unidirectional rotating support assemblies 100a–d, 200c, the support members 140a–d are configured so as to be generally supported by the aperture bottom 10. It is within the scope of the present invention, however, for the support members 140 for any of the unidirectional rotating support assemblies 100, 200 according to the first aspect of the present invention to also be configured so as to be supported from the work station top surface 6.

Figure 7A:
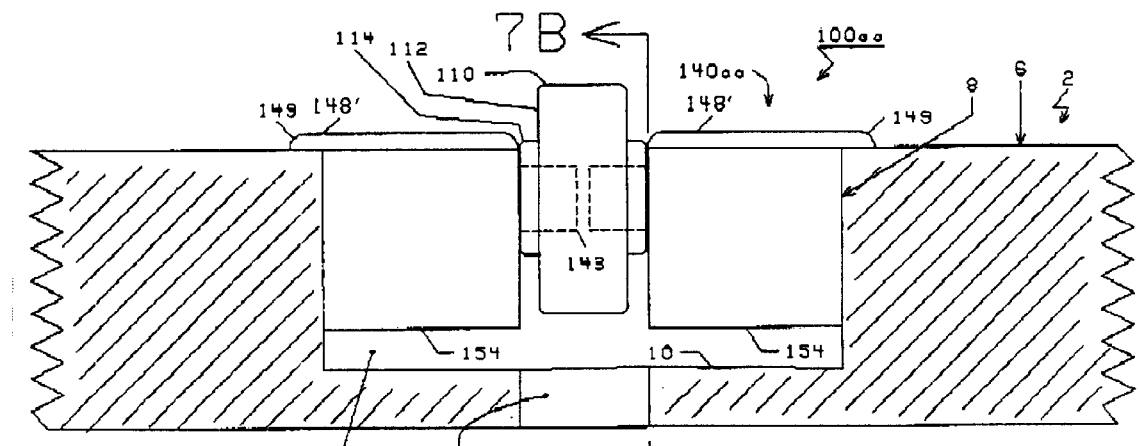
FIG. 7A is another cross-sectional view of the work station of FIG. 1 proximal an aperture along line 2A—2A including a wheeled unidirectional rotating support assembly according to an alternative embodiment.
Figure 7B:
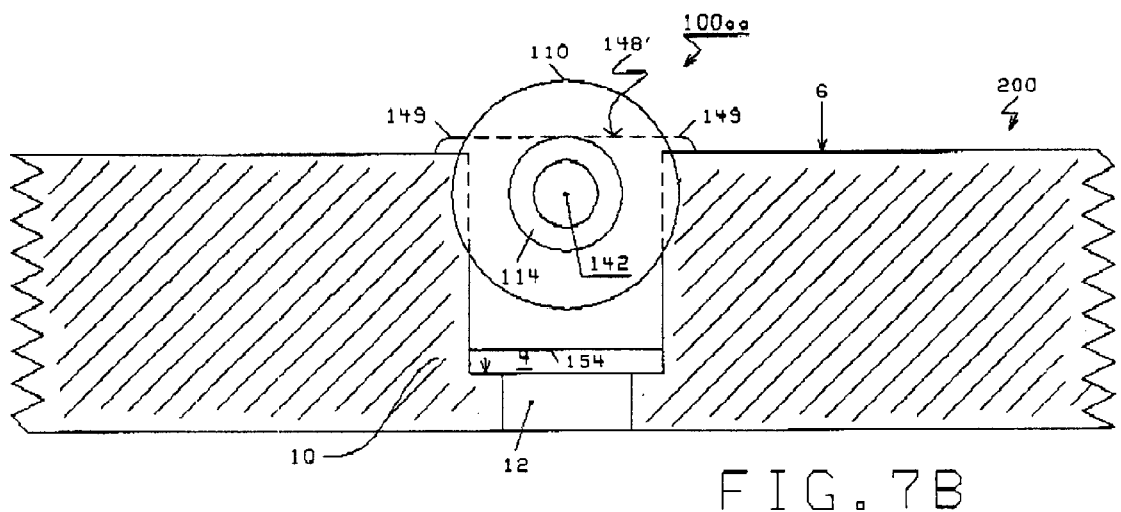
FIG. 7B is a cross sectional view of the wheeled unidirectional rotating assembly of FIG. 7A taken through line 7B—7B thereof.

There is shown in FIGS. 7–8 a cross-sectional view of a work station 2 proximal an aperture 4, along lines 2A—2A and 4A—4A respectively, that illustrate respectively a wheeled and a roller unidirectional rotating support assembly 100*aa*, 200*ca* including support members 140*aa*, 140*ca* that are configured so as to be supported from the work station top surface 6. There also is shown in FIGS. 9–10 various and exemplary embodiments of support members 140*aa*, 140*ba*, 140*ca*, 140*da* which are adaptable for use with any of the wheeled or roller unidirectional rotating support assemblies 100,200 according to the first aspect of the present invention.

Figure 9A:
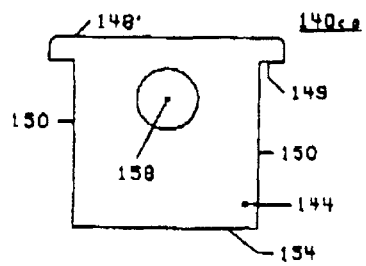
FIGS. 9A–F are various views of support members as shown in FIGS. 7–8.
Figure 9B:
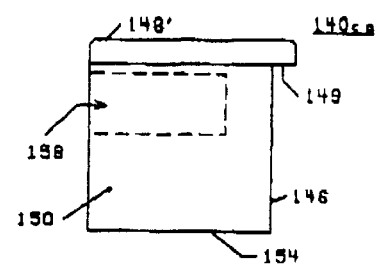
Figure 9C:
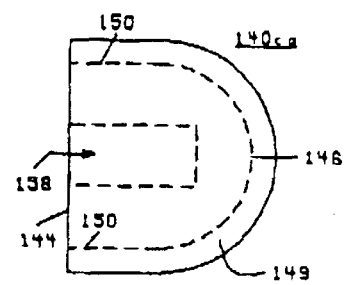
Figure 9D:
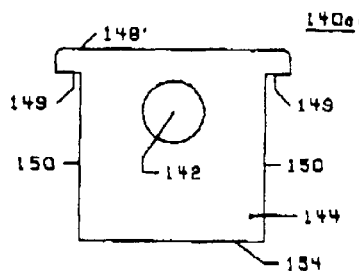
Figure 9E:
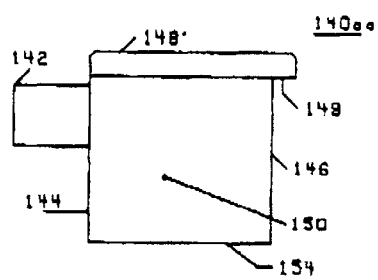
Figure 9F:
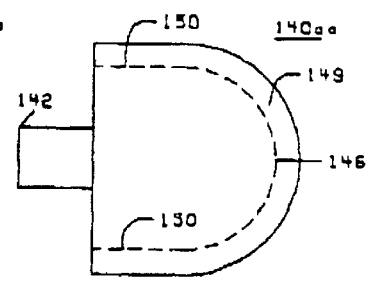
Figure 10A:
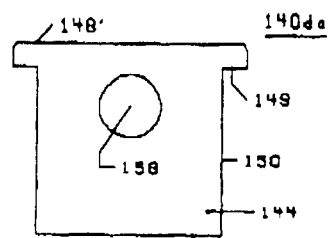
FIGS. 10A–F are various views of support members having a different geometric shape than that shown in FIGS. 9A–F.
Figure 10B:
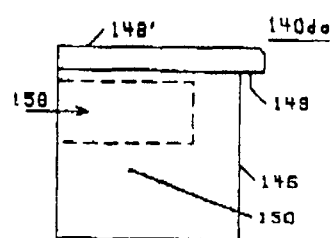
Figure 10C:
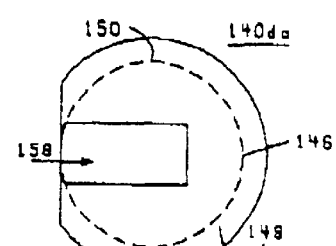
Figure 10D:
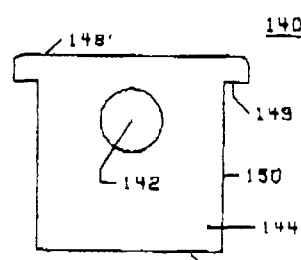
Figure 10E:
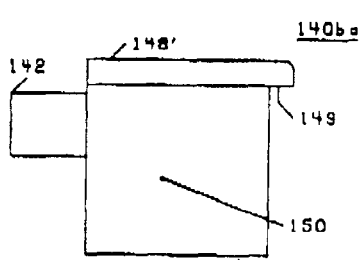
Figure 10F:
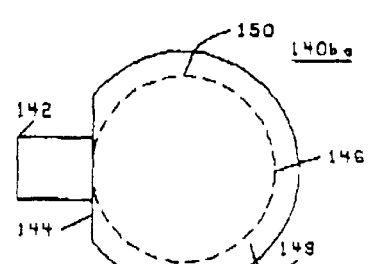

Referring now to FIGS. 7A,B and FIGS. 9D–F, there is shown one embodiment of a wheeled unidirectional rotating support assembly 100*aa* that is supported from the work station top surface 6 and which is disposed in the work station aperture 4. The wheeled unidirectional rotating support assembly 100*aa* includes a wheel 110 and two support members 140*aa* that are particularly configured to rotatably support the wheel. As with the foregoing discussion regarding FIG. 2–3, the work station aperture 4 is formed, machined or otherwise provided in the work station top surface 6.

Figure 8A:
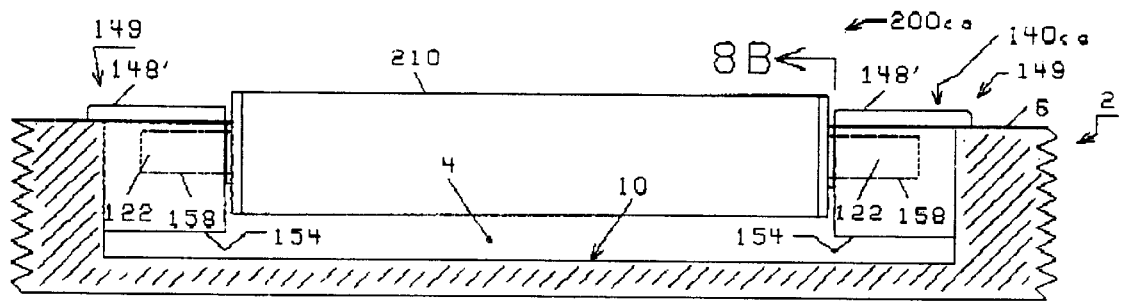
FIG. 8A is another cross-sectional view of the work station of FIG. 1 proximal an aperture along line 4A—4A including a roller unidirectional rotating support assembly according to an alternative embodiment.
Figure 8B:
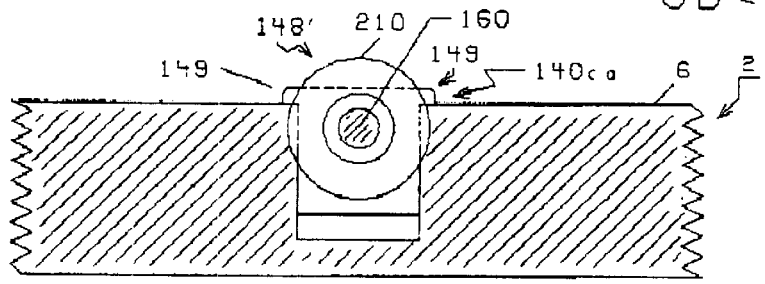
FIG. 8B is a cross sectional view of the roller unidirectional rotating assembly of FIG. 8A taken through line 8B—8B thereof.

Each aperture is formed so as to have a bottom 10, as illustrated in FIGS. 8A–B, or a bottom that is configured so as to include a through aperture 12 in a portion of the aperture bottom 10, as illustrated in FIGS. 7A,B. Alternatively, the bottom through aperture 12 can be arranged or extended so it completely encompasses the aperture bottom 10 and thus in effect forms a through aperture that extends between the top surface 6 and the bottom surface of the work station 2. Providing a bottom through aperture 12 provides a mechanism by which debris or other material that gets around the wheel 110 can exit from the work station aperture 4, thereby minimizing the potential for jamming of the wheel 110 by such debris or material.

This support member 140*aa* embodiment that is supported from the work station top surface 6 differs from the support member 140*a* described above in connection with FIGS. 5D–F in that the support member top surface 148' of this embodiment extends outwardly beyond the sides 150 and the proximal end 146 thereof, or portions of the sides and/or proximal end, to create an extension segment 149. This support member 140*aa* also differs in that the mechanism for adjusting the support member with respect to the aperture bottom 10 need not be provided. Reference should be made to the foregoing discussion regarding the support member 140*a* shown in FIGS. 5A–C as to the details for the common features and/or components identified by the same or a similar reference numeral that are not otherwise provided or described below.

The extension segment 149 is generally configured and sized so it overlaps the work station top surface 6 a sufficient amount (i.e., overlaps a sufficient surface area of the top surface) to support the support member 140*aa* so it cannot be displaced within or into the work station aperture 4 in either a loaded or unloaded condition. This also assures that the portion of the wheel 110 extending above the work station top surface 6 remains above the top surface when a load is imposed thereon. In other words, when an article is rotatably passed over the wheel 110, the downward load imposed by the article does not cause the support member 140*aa* and thus the wheel to be pushed into the aperture 4.

In the illustrated embodiment, the extension segment 149 extends about a substantial portion of the circumference of the support member that generally includes both of the sides 150 and the proximal end 146. This, however, shall not be construed as a limitation. The extension segment 149 can be disposed about portions of the circumference that are sufficient to prevent substantial downward movement of the support member 140*aa* and the wheel 110 when a normal load is imposed thereon. In specific embodiments, the extension segment 149 extends about ½, ⅔, or ¾ of the circumference of the support member 140*aa* or along the two sides 150 of the support member.

In addition, the extension segment 149 is configurable so the support member top surface 148' forms any of a number of geometric configurations including, but not limited to, polygonal, rectangular or rectilinear or circular shapes. The shape of the support member top surface 148' also can be established such that it complements the cross-section shape defined by the sides 150 and the distal and proximal ends 144,146. For example, both the top surface 148' and this cross section can be in the form of a truncated oval shape such as that shown in FIGS. 9A–F. Alternatively, the top surface 148' can be configured with a shape or geometric configuration that is different from that of the cross-section, for example a rectangular top surface and a truncated oval cross-section. Although the top surface 148' is illustrated as being flat, and as discussed above, it is within the scope of the present invention for the top surface to be configured with any geometric shape projecting upward from the work station top surface 6.

Referring now to FIGS. 7AC–E, there is shown another embodiment of a wheeled unidirectional rotating support assembly 100*ea* that is supported from the work station top surface 6 and which is disposed in the work station aperture 4 (FIG. 1A). The wheeled unidirectional rotating support assembly 10*ea* includes a wheel 110, a support member 140*ea* having two side sections 141 and an axle 170*d* that extends between the support member side sections and so as to rotatably support the wheel. As with the foregoing discussion regarding FIG. 2–3, the work station aperture 4 is formed, machined or otherwise provided in the work station top surface 6 and can be configured so to have a bottom 10 (e.g., a blind hole), a bottom that is configured so as to include a through aperture 12 in a portion of the aperture bottom 10 or the aperture can be configured as a through aperture without a bottom.

Each support member side section 141 includes a top portion and a side portion, the side portion being at an angle with respect to the top portion. In a particular embodiment, the side portion is about perpendicular to the top portion such that each support member side section 141 is generally L-shaped member. The upper surfaces of the side section top portions comprises the support member top surface 148' that extends outwardly beyond the sides 150, the outer surfaces of the side section side portions, so as to create an extension segment 149. Reference should be made to the foregoing discussion regarding the support member 140*ca* shown in FIGS. 9A–C as to the details for the common features and/or components identified by the same or a similar reference numeral that are not otherwise provided or described below, for example the wheel.

The side 150 of each support member side section 141 is configured so as to include an axle receiving aperture 158 that receives an end portion of the axle 170*d*. In the illustrated embodiment, the ends of the axle 170*d* are riveted so as to secure the axle to the opposing sides 150 of the support members side sections 141. Instead of the riveted style axle, a screw type of axle 170*c* (FIG. 19C) is used, where the heads 176*a,b* (FIGS. 19D,E) at either end of the screw type axle provide a mechanism to secure the axle between the sides 150 of the opposing support member sections 141. In yet another specific embodiment, a spring loaded axle 170*b* (FIG. 19B) could be used and the axle receiving apertures 158 could be configured in the form of blind holes (i.e., an aperture with a bottom). Thus, when the support member sections 141 are inserted into the work station aperture 4, the spring 174 within the axle acts on of each of the support member sections 141 so as to cause the support member side sections 141 to contact inner surfaces of the work station aperture.

As described above in the discussion concerning FIG. 9–10, the extension segment 149 is generally configured and sized so it overlaps the work station top surface 6 a sufficient amount (i.e., overlaps a sufficient surface area of the top surface) to support each support member side section 141 and thus the support member 140*ea* so it cannot be displaced within or into the work station aperture 4 in either a loaded or unloaded condition. This also assures that the portion of the wheel 110 extending above the work station top surface 6 remains above the top surface when a load is imposed thereon. In other words, when an article is rotatably passed over the wheel 110, the downward load imposed by the article does not cause the support member side sections 141 and thus does not cause the support member 140 and the wheel to be pushed into the aperture 4.

In the illustrated embodiment, the extension segment 149 extends along the length of the support member and at an angle with respect to the axis of rotation for the wheel 110. In addition, the extension segment 149 is configurable so the support member top surface 148' forms any of a number of geometric configurations including, but not limited to, triangular, polygonal, rectangular or rectilinear or truncated arcuate shapes. It also is within the scope of the present invention for the side portion of each support member 140*ea* to be configured to include one or more segments that are at an angle with respect to each. In this case, the top portion and thus the support member top surface 148' can be arranged so as to generally follow the geometric shape formed by the side portion segments or could be configured with any geometric shape as described above. Although the top surface 148' is illustrated as being flat, and as discussed above, it is within the scope of the present invention for the top surface to be configured with any geometric shape projecting upward from the work station top surface 6.

There is shown in FIG. 7F another embodiment of a wheeled unidirectional rotating support assembly 100*fa* that is supported from the work station top surface 6 and which is disposed in the work station aperture 4 (FIG. 1A). The wheeled unidirectional rotating support assembly 100*fa* includes a wheel 110, a support member 140*fa* having two side sections 141 and a bridge member 141', and an axle 170*d* that extends between the support member side sections and so as to rotatably support the wheel. Reference shall be made to the foregoing discussion regarding FIGS. 7C–E as to the details for the common features and/or components identified by the same or a similar reference numeral that are not otherwise provided or described below.

The bridge member 141' is interconnected to each of the side sections 141 such that each side section side portion is at an angle with respect to the bridge member. In an illustrative embodiment, the angle formed therebetween is essentially a right angle. The interconnection of the bridge member 141' and the support member side sections yields a unitary structure that provides added strength as compared to the support member 140*ea* of FIGS. 7C–E as well as providing a structure for ease of assembly.

As indicated above, the support assembly can be configured or arranged so the top surface thereof is in the form of any of a number of geometric shapes and that the side sections also can be configured so as to present any of a number of geometric configurations. It also is within the scope of the present invention for the support assembly to be configured so as to form a unitary structure having any geometric shape that is otherwise consistent with the self supporting teachings of the present invention. There is shown in FIG. 7G a wheeled unidirectional support assembly 100*ga* including a support member 140*ga* having a top portion and side portion that are arranged so as to form a support member having a unitary (i.e., single member) construction. The top portion comprises the top surface 148' of the support member 140*ga* and in the illustrative embodiment the top surface 148' is generally oval or ovaloid in shape, however, other geometric configurations are contemplated and thus are within the scope of the present invention. Reference shall be made to the foregoing discussion regarding FIGS. 7C–F as to the details for common features and/or components that are not otherwise provided on FIG. 7G nor described above.

The foregoing is illustrative or exemplary of some particular embodiments of a wheeled unidirectional rotating support assembly 100*aa* that is supported from the work station top surface 6. However, it is within the scope of the present invention for any of the support members 140*ea, fa, ga,* illustrated in FIGS. 7C–G, any of the support members 140*aa, ba, ca, da* illustrated in FIGS. 9–10, or any other support member 140 otherwise according to the first aspect of the present invention that is configured so as to be supported from the work station top surface 6, to be adapted for use to rotatbly support a wheel 110. For example, and with particular reference also to FIGS. 3A,B and FIGS. 5A–C, each support member 140*ca* can be configured with an axle receiving aperture 158 and the assembly can further include an axle 170. The axle 170 extends between the axle receiving apertures 158 of the support members and rotatably supports the wheel 110. In general, reference should be made to the foregoing discussion regarding the above-described wheeled unidirectional rotating support assemblies 100*a–d* for details concerning the support member and other features of the support member and the corresponding roller unidirectional rotating support assembly not otherwise described herein.

Referring now to FIGS. 8A,B and FIGS. 9A–C, there is shown an embodiment of a roller unidirectional rotating support assembly 200*ca* that is supported from the work station top surface 6 and which is disposed in an aperture 4 that is formed, machined or otherwise provided in the work station top surface 6. The roller undirectional rotating support assembly 200*ca* includes a roller 210, two support members 140*ca* and an axle 170. As indicated above, each aperture also is formed so as to have a bottom 10 or a bottom that is configured to include a through aperture 12 in at least a portion thereof. Alternatively, the bottom through aperture 12 can be arranged so it completely encompasses the aperture bottom 10 and thus in effect forms a through aperture that extends between the top surface 6 and work station bottom surface.

The support member 140*ca* for this embodiment differs from the support member 140*a* described above in connection with FIGS. 5A–C in that the support member top surface 148' extends outwardly beyond the sides 150 and the proximal end 146 thereof, or portions of the sides and/or proximal end, to create an extension segment 149. This support member 140*aa* also differs in that the mechanism for adjusting the support member with respect to the aperture bottom 10 need not be provided. Reference should be made to the foregoing discussion regarding the support member 140a shown in FIGS. 5A–C as to the details for the common features and/or components identified by the same or a similar reference numeral that are not otherwise provided or described below.

As to the extension segment 149 shown in each of FIGS. 9A–C and 8A,B, reference should be made to the foregoing discussion regarding FIGS. 7A,B and 5D–F for further details concerning the configuration, sizing and geometric shape of the extension segment 149 and the support member top surface 148'. The foregoing, and that shown in FIGS. 8A–B, is illustrative or exemplary of one embodiment of a roller unidirectional rotating support assembly 200ca that is supported from the work station top surface 6. As indicated above, it is within the scope of the present invention for any of the support members 140ea, fa, ga illustrated in FIGS. 7C–G, any of the support members 140aa, ba, ca, da illustrated in FIGS. 9–10, or any other support member 140 otherwise according to the first aspect of the present invention, that is configured so as to be supported from the work station top surface 6, to be adapted for use to rotatably support a roller 210 as taught herein.

There is shown in FIGS. 10A–F support members 140da, bd, that are similar to the support members 140aa, ca shown in FIGS. 9A–F except for the particular geometric configuration. Thus, reference should be made to the foregoing discussion regarding FIGS. 9A–F as to the details for the features and/or components identified by the same or a similar reference numeral. It should be recognized, and as generally provided above, that the geometric configurations or shapes of the illustrated support members 140aa, ba, ca, da are exemplary and do not constitute a limitation. As it is within the scope of the present invention for the support members to have any geometric shape that would yield a support member having the characteristics described herein.

For the above-described support members 140aa–da shown in FIGS. 9–10, the projecting member 142 and the axle receiving aperture 158 are located a set distance from the back or bottom surface of the extension segment 149, thereby also locating the axis of rotation with respect to the work station top surface 6. The position of the axle receiving aperture 158 or the projecting member 142 with respect to the work station top surface 6 can be adjusted and controlled using any of a number of techniques known to those skilled in the art.

For example, a plurality of the support members 140aa–da can be made so that there are pairs of support members that have different distances between the back surface of the extension segment 149 and the axle receiving aperture 158 or the projecting member 142. In this case, one would select a pair of support members having the appropriate distance so the axis of rotation would be at the desired location or position with respect to the work station top surface 6 when disposed within the work station aperture 4.

Alternatively, the work station top surface 6 could be modified locally so as to raise or lower the extension segment 149 with respect to the major portions of the work station top surface. For example, to lower the axle receiving aperture 148 or the projecting member 142 with respect to the top surface 6 a local depression is formed, machined or otherwise provided in the work station top surface 6 proximal and about the work station aperture 4. This local depression is generally configured so at least the extension segment 149 is disposed in the depressed region and thus below the major portions of the work station top surface 6.

Correspondingly, to raise the axle receiving aperture 158 or the projecting member 142 with respect to the work station top surface 6, a local elevated region is established in the top surface proximal and about the work station aperture 4. This local elevated region is generally configured so at least the extension segment 149 would be completely received on the region. Alternatively, shims or other height increasing devices can be located proximal and about the work station aperture 4 to locally raise the extension segment 149 above the major portions of the work station top surface 6.

Referring now to FIGS. 11–17 there are shown various views of unidirectional rotating support assemblies according to a second aspect of the present invention that are disposed in the apertures 4 in the top surface 6 of a work station 2. In particular, various embodiments of wheeled a unidirectional rotating assembly 300 and corresponding various embodiments of the support member 340 are shown in FIGS. 11–15 and an exemplary embodiment of a roller unidirection rotating support assembly 400 and corresponding support member 440 is shown in FIGS. 11 and 16A–C. The illustrated work station 2 includes a relatively flat surface as the top surface 6 with a plurality of apertures 4 formed, machined or otherwise provided therein. Reference shall be made to the foregoing discussion regarding any of the unidirectional rotating support assemblies 100 according to the first aspect for further details regarding the construction and make-up of the illustrative work station 2 as well as for any other reference numeral shown on any of the below identified figures or referred to hereinafter and not explicitly shown on the identified figures or, if shown, not explicitly described hereinafter.

As indicated above, the unidirectional rotating support assemblies according to any aspect of the present invention can be arranged so as to form any configuration or arrangement of unidirectional rotating support assemblies on the work station top surface 6. In FIG. 1 it is shown illustratively that the unidirectional rotating support assemblies can be arranged so as to form travel lanes that traverse the width of the work station 2 and so as to be integrated along with any of a number of other rotating support assemblies known in the art. It is within the scope of the present invention for the unidirectional rotating support assemblies according to the second aspect to be utilized in the work station configuration as illustrated in FIG. 1.

Additionally, the unidirectional rotating support assemblies according to any aspect of the present invention can be arranged in a work station top surface 6 as shown illustratively in FIG. 11 so the articles being transported across the work station top surface are moved along a changing travel path. For example, and as illustrated in FIG. 11, a transiting article can enter upon the work station top surface from one direction, traverse a substantial portion of the top surface, and exit the top surface in a substantially different direction from where the transiting article entered and/or traversed the top surface. As indicated above, the assembly arrangement shown in FIGS. 1 and 11 are illustrative and thus not exhaustive of every possible arrangement or combination of support assemblies and/or types of work stations. Thus, the travel path arrangement illustrated in FIG. 11 is not a limitation as the pathway can be arrange so as to form any of a number of path change arrangements, for example a straight path at an angle with respect to the long axis of the work station 2.

As also shown in FIG. 11, any of the unidirectional rotating support assemblies 300,400 according to the second aspect can be used in combination with any of the unidirectional rotating support assemblies 100,200 according to the first aspect. As also provided above in discussion regarding FIG. 1, the unidirectional rotating support assemblies 300,400 according to the second aspect can be combined for use with other types of devices known to those skilled in the art including, but not limited to, pop-up ball assemblies, retractable pneumatic ball transfer assemblies, omnidirectional ball transfers and pop-up pad assemblies. For example, pop-up pad assemblies 30 (FIG. 1) could be positioned in the work station top surface 6 in the area where the wheeled unidirectional rotating support assemblies 300 form a straight pattern. Thus, when a transiting article is located in this area, the worker can actuate the pop-up pads so the transiting article is raised above the wheels 110 like that discussed above in connection with FIG. 1 so the designated task could be performed by the worker while the product is being held in place.

In general terms, each wheeled unidirectional rotating support assembly 300 includes a wheel 110, a support member 340 and a mechanism by which the wheel is rotatably supported from the support members. The wheel 110 is configured so as to included a hub 114, having an aperture 116 therein, and a rotating part 112. The hub 114 is typically and rotatably interconnected to the rotating part 112 by a bearing system, bushing, or the like, whereby the rotating part can rotate about the hub with little or no friction in the unloaded condition. The wheel 110, however, shall be any wheel known to those skilled in the art which can be used with the support members herein described to rotatably support an article passing thereover. For example, the wheel 110 can be configured with a shaft member, instead of the hub aperture 116, that extends from either side of the wheel. The shaft member would be received within the above-described and below-described axle receiving aperture of a support member and thus in effect replace the axle 170.

In FIGS. 11–15 reference numeral 300 is used to generally identify a wheeled unidirectional rotating support assembly according to the second aspect, and reference numeral 340 is used to generally identify the support member for each said assembly. Similarly, reference numeral 400 is used to generally identify a roller unidirectional rotating support assembly according to the second aspect and reference numeral 440 is used to generally identify the support member for each said assembly. In the following discussion, when reference is being made to a specific embodiment of the unidirectional rotating support assemblies and/or support member, each of these reference numerals will further include an alpha character (e.g., 300a, 340a) so as to uniquely identify the embodiment being particularly described. Thus, when reference is made to one of reference numerals 300,340,400 or 440 in the following, it shall be understood that reference is being made in general to a wheeled or roller unidirectional rotating support assembly or the support member respectively therefore.

Figure 12A:
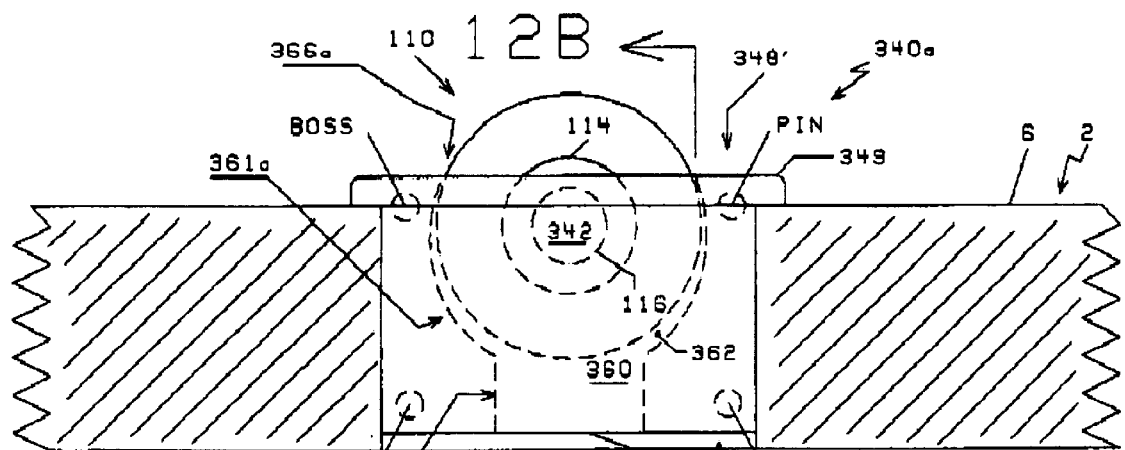
FIG. 12A is a cross-sectional view of the work station of FIG. 11 taken through line 12A—12A thereof.
Figure 12B:
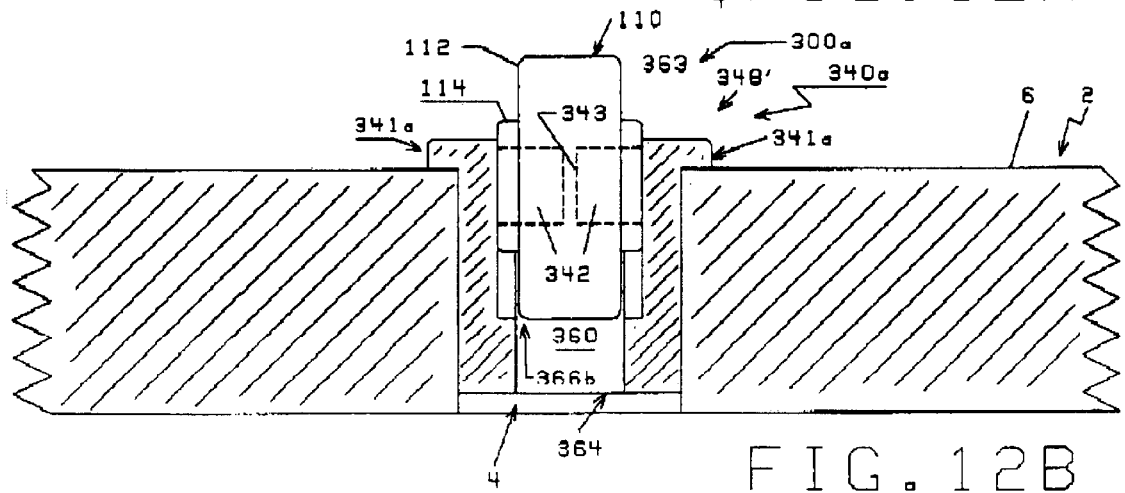
FIG. 12B is a cross-sectional view of FIG. 12A taken through line 12B—12B.

Now referring specifically to FIGS. 12A,B and 13A–C, there is shown one embodiment of a wheeled unidirectional rotating support assembly 300a that includes a wheel 110, a support member 340a that includes two sections 341a,b each section being particularly configured so as to rotatably support the wheel 110. In the illustrated embodiment, the two support member sections 341a,b are secured to and aligned with each other by means of pins and bosses in the sections. The pins and bosses are arranged in the support member sections 341a,b so that a pin or projection in one support section is received in a corresponding and opposing boss or socket in the other section. It is within the scope of the present invention for any of a number of other means or mechanisms known to those skilled in the art be used for securing and aligning the support member sections 341a,b to form a support member 340 that can rotatably support a wheel 110.

Each support member section 341a includes a depressed region that extends in a direction generally perpendicular to a plane defined by the support member top surface 348' and along an axis (e.g., long axis) of this plane. When the support member sections 341a,b are assembled so as to form the support member, the depressed regions in the opposing support member sections 341a,b cooperate so as to form an interior aperture 360 in the support member 340a. As further described herein, the wheel 110 is rotatably disposed within the interior aperture 360 such that a portion of the wheel is above the work station top surface 6.

The cooperation of the depressed regions in the support member sections 341a,b also forms an interior aperture 360 having an upper portion 361a and lower portion 361b. As illustrated in FIGS. 12A and 13B, the upper portion 361a preferably forms a cavity 362 in which is disposed a portion of the wheel 110 and the lower portion 361b forms a through aperture 364 that communicates with the upper portion cavity 362. The lower portion through aperture 364 provides a mechanism for directing debris or other material, that gets around the wheel 110 and into the upper portion cavity 362, out of the upper portion cavity and thus the interior aperture 360. It is within the scope of the present invention, however, for the depressed regions to cooperate so as to form an interior aperture having only a cavity 362 in which is disposed a portion of the wheel. Although the cavity 362 is generally illustrated as being arcuate, it is within the scope of the present invention for the cavity to have any geometric shape such as a rectangular or polygonal shape.

Correspondingly, each work station aperture 4 is configured so as to be in the form of a through aperture that extends between the top surface 6 and the bottom surface of the work station 2, as illustrated in FIGS. 12A,B. Alternatively, and with reference to FIG. 14B, the work station aperture 4 is formed so as to have a bottom 10 that is configured so as to include a through aperture 12 in a portion of the aperture bottom proximal the lower portion through aperture 364. In this way, the debris or other material that is exiting from the lower portion through aperture 364 also can exit from the work station aperture 4, thereby minimizing the potential for jamming of or damaging the wheel 110 by such debris or material. As also described above, the work station 4 can be a blind hole formed or machined in the work station top surface 6.

Referring now to FIGS. 1, 12A,B and 13A–C, in a specific embodiment, the upper portion cavity 362 is configured so the end surfaces of the cavity are arranged to minimize the size of the gap 366a or space between the exterior cicumferential surfaces of the wheel rotating part 112 and the opposing surface of the upper portion cavity that are proximal the support member top surface 348'. Additionally, and as shown more clearly in FIGS. 13A–B, the side surfaces comprising the interior aperture upper portion 361a are arranged so as to provide a local indent or depression 363 proximal the projecting member 342. The depression 363 is sized and configured to receive the hub 114 of the wheel 110 therein. Preferably, the depression also is sized and configured to minimize the opening or gap 361b between the side surfaces of the wheel rotating member 112 and the opposing surfaces of the interior aperture upper portion 343a. The minimization of these gaps 361a,b thereby minimizes or restricts the amount and kind (e.g., size) of debris or material that can enter into the interior aperture 360.

The end and bottom surfaces of the upper portion cavity 362 are further arranged so they form a curved surface about the axis of rotation for the wheel 110. More particularly, the end and bottom surfaces of the upper portion cavity 362 are curved such that the gap 361a between the exterior cicumferential surfaces of the rotating part 112 and the opposing surfaces of upper portion cavity 362 increases as the curved surfaces approach the lower portion through aperture 364. The curved shape, as well as the increasing size of the gap, generally facilitates the movement of debris and material in the upper portion cavity towards the lower portion through aperture 364.

As indicated above, the support member sections 341a,b are each particularly configured to rotatably support the wheel 110. More specifically, each of the support member sections 341a,b includes a projecting member 342 that projects inwardly from the side surfaces of the interior aperture upper portion 361a so each projecting member is received within the hub through aperture 116. As indicated in the discussion above regarding the first aspect of the present invention, the projecting member 342 can have any geometric shape that would otherwise be consistent with the capability of rotatably supporting the wheel including cylindrical shapes or a spline shape. For further details regarding the projecting member 342 including for example, the length of the projecting member and adjusting the location of the projecting member or axis of rotation with respect to the work station top surface 6, reference should be made to the foregoing discussion for the corresponding component for the first aspect.

When the support member sections 341a,b are mated to each other, the support member 340a formed thereby includes a proximal end 346, sides 350 and a distal end 344. The distal and proximal ends 344,346 and the sides 350 are sized and configured so the support member 340a has limited to no play or motion within the work station aperture 4 when the support member is disposed in the work station aperture. In this way, the axis of rotation for the wheel 110 is generally fixed with respect to the work station aperture 4 so there is limited to no motion of the wheel 110 in the plane defined by the top surface 148' transverse to and/or along the axis of rotation. Thus, an article passing across the work station top surface 6 and being rotatably supported by one or more wheeled unidirectional rotating support assemblies 300a should not cause each support member 340a in the top surface to be moved laterally or longitudinally within the corresponding work station aperture 4.

The support member top surface 348' formed by the mating of the support member sections 361a,b is configured so as to include an extension segment 349 that extends outwardly from and beyond the sides 350 and ends 344,346 of the support member 340a. In this way, the support member 340 is supported from the work station top surface 6 by the extension segment 349, when the support member is disposed in the work station aperture 4. The extension segment 349 is generally configured and sized such that it overlaps the work station top surface 6 proximal the work station aperture 4 an amount that is sufficient to support the support member 340a so the support member is not displaced within or into the work station aperture when in either a loaded or unloaded condition. Thus, an article passing across the work station top surface 6 and being rotatably supported by one or more wheeled unidirectional rotating support assemblies 300a should not cause each support member 340a in the top surface to be moved vertically within the corresponding work station aperture 4.

For other and further details regarding the ends 344,346, sides 350, top surface 348' and extension segment 349 of the second aspect, reference shall be made to the above discussion regarding the distal and proximal ends 144,146, sides 150, top surface 148' and extension segment 149 according to the first aspect. In particular the discussion that concerns FIGS. 7A,B and FIGS. 9D–F.

In a specific illustrative embodiment, the support member 340a is split along the long axis of the support member at a point midway between the sides 350 so as to form the support sections 34 1a,b. The support member 340a, however, is configured o as to be divisible into two or more sections that can be mated to each other to form a support member according to the second aspect of the present invention. For example, the support member can be configured so it is split or divided along the short axis at a point midway between the distal and proximal ends 344,346 and more specifically so as to bisect the opposing projecting members 342.

Referring now to FIGS. 13D–F there is shown another embodiment of a wheeled unidirectional rotating support assembly 300b that includes a wheel 110, a support member 340b and an axle 170, where the wheel is disposed about and rotatably supported by the axle. This illustrative embodiment, has some features in common with those described above in connection with FIGS. 12A,B and 13A–C, accordingly reference shall be made to the foregoing discussion regarding these figures for related details not described more particularly below and/or not shown on FIGS, 13D–F. As also noted above, reference shall be made to the foregoing discussion regarding the first aspect of the present invention for further details for any reference numeral shown on FIGS. 13D–F or refereed to hereinafter and not explicitly shown on the identified figures, or, if shown, not explicitly described hereinafter.

The support member 340b for this embodiment differs from that shown in FIGS. 13A–C in that the support member sections 341a,b are each configured so as to include an axle receiving aperture 358 that receives an end portion of the axle 170. The axle receiving apertures 358 are located in the support member sections 341a,b so that the axle receiving aperture in one section 341a is opposed to the axle receiving aperture in the other section 341b when the support member sections are mated to each other. Additionally, an open end of each axle receiving aperture 358 communicates with the support member interior aperture 360 and the axle 170 extends between the axle receiving apertures and across the interior aperture. Thus, when the wheel 110 is being rotatably supported by the axle 170, the wheel is also disposed within the support member interior aperture 360.

In one specific embodiment, each of the axle receiving apertures 358 are configured and arranged with a bottom. The bottoms of the axle receiving aperture 358 restrain lateral movement of the axle 170 so there is little to no drifting or motion of the axle 170 in a side-to-side direction within the support member 340b. Accordingly, the axle 170 and support member 340b are resistant to normal loads and forces in the axial direction.

In another specific embodiment, at least one axle receiving aperture 358 is sized and configured so the fit between the axle end portion and the walls of the aperture is such that the axle end portion remains secured within the axle receiving aperture and is generally resistant to normal loads and forces in the axial direction with or without the added influence of the aperture bottom. Alternatively, both axle receiving apertures 358 are so sized and configured. In a specific embodiment, one or both of the axle receiving apertures 358 are configured and arranged so there is a snug-fit or interference fit between the axle receiving apertures and the axle end portions.

In a further specific embodiment, one or both of the axle receiving apertures 358, are configured so as to form a through aperture that extends between the side 350 of the support member 340b and the side surfaces of the interior aperture 360. For example, one axle receiving aperture is configured in the form of a through aperture that slidably receives the axle 170 and the other axle receiving aperture is configured so there is an interference or snug fit with an axle end portion. Also, one axle receiving aperture can be arranged with a bottom to restrain axial movement in one axial direction and the other axle receiving aperture is configured so there would be an interference fit so as to restrain movement in the opposition axial direction. With either of these configurations, the axle 170 can be slidably inserted in to the axle receiving aperture in the form of the through aperture so the axle extends across the interior aperture and so an axle end portion is received in said other axle receiving aperture. Such a configuration also allows the axle and wheel to be installed in the support member after the support member sections 341a,b have been mated to each other.

Preferably, the axle 170 is fixed or non-rotating and the wheel 110 disposed thereon, includes a bearing subsystem or other mechanism known to those skilled in the art that allows the wheel to rotate relatively freely or with little friction in the unloaded state about the axle. Alternatively, the wheel 110 is secured to the axle 170 and any of a number of mechanisms or methods known to those skilled in the art is provided to allow the axle to rotate with respect to each of the support members 340c. As noted above, reference shall be made to the foregoing discussion regarding the first aspect of the present invention for further details regarding the axle 170 and the mechanism by which the wheel 110 is rotatably disposed thereon.

Referring now to FIGS. 13G–I there is shown another embodiment of a wheeled unidirectional rotating support assembly 300c that includes a wheel 110, a support member 340c and an axle 170, where the wheel is disposed about and rotatably supported by the axle. This illustrative embodiment, has some features in common with those described above in connection with FIGS. 12A,B and 13A–F, accordingly reference shall be made to the foregoing discussion regarding these figures for related details not described more particularly below and/or not shown on FIGS. 13G–I. As also noted above, reference shall be made to the foregoing discussion regarding the first aspect of the present invention for further details for any reference numeral shown on FIGS. 13G–I or refereed to hereinafter and not explicitly shown on the identified figures, or, if shown, not explicitly described hereinafter.

The support member 340c for this embodiment differs from that shown in FIGS. 13D–F in that the support member for this embodiment is formed as a unitary structure without the sub-dividing sections 341 shown in FIGS. 13D–F. This unitary structure for the support member is configured so as to include axle receiving apertures 358 in the sides thereof that are opposed to each other and so an open end of each axle receiving aperture communicates with the support member interior aperture.

The support member 340c also is configured so an open end is provided in the exterior surface of the support member at another end of at least one axle receiving aperture 356. In this way, the at least one axle receiving aperture forms a through aperture that extends from the support member exterior surface to the support member interior aperture. The axle 170 is inserted into the open end in the exterior surface for the at least one axle receiving aperture 358 such that the axle extends across the support member interior aperture 360 and so that an end portion of the axle is received within the other axle receiving aperture. Thus, when the wheel 110 is being rotatably supported by the axle 170, the wheel also is disposed within the support member interior aperture 360.

In an exemplary embodiment, this at least one axle receiving aperture 358 is arranged and sized so that the axle 170 is slidably received therein. Also, the other axle receiving aperture 358 is sized and configured so the fit between the axle end portion and the interior of this other aperture is such that the axle end portion remains secured within the axle receiving aperture and is generally resistant to normal loads and forces in the axial direction. In a more particular embodiment, this other axle receiving aperture is configured and sized so that there is a snug or interference fit between the axle receiving aperture and the end portion being received therein. Alternatively, the axle 170 or an end portion thereof is knurled so the axle can be pressed into the axle receiving aperture 358 and be rotated.

It is within the scope of the present invention for the support member 340c to configured so that both axle receiving apertures 358 form a through aperture that extends between the support member exterior surface and the support member interior aperture 360. Additionally, either axle receiving apertures can be configured and sized such that the corresponding end portion of the axle 170 remains secured within its respective axle receiving aperture and so each is generally resistant to normal loads and forces in the axial direction. Alternatively, both axle receiving apertures 358 can be so configured to secure both end portions of the axle 170 therein. The above described support member 340c is thus configured and arranged so as to allow the axle 170 and the wheel 110 to be installed at anytime in the unitary structure comprising the support member.

For this embodiment, or for any of the other described wheeled unidirectional rotating support assembly of the present invention, the axle 170 is preferably fixed or non-rotating and the wheel 110 disposed thereon, includes a bearing subsystem or other mechanism known to those skilled in the art that allows the wheel to rotate relatively freely or with little friction in the loaded or unloaded state about the axle. Alternatively, the wheel 110 is secured to the axle 170 and any of a number of mechanisms or methods known to those skilled in the art is provided to allow the axle to rotate with respect to each of the support members 140c. As noted above, reference shall be made to the foregoing discussion regarding the first aspect of the 110 present invention for further details regarding the axle 170 and the mechanism by which the wheel 110 is rotatably disposed thereon.

For the above described wheeled unidirectional rotating support assemblies 300a–c, the support members 340a–c are configured so as to be supported from the work station top surface 6. This is not a limitation, however, as it is within the scope of the present invention for any wheeled unidirectional rotating support assembly according to the second aspect of the present invention to be supported by the aperture bottom 10. There is shown in FIGS. 14A–B and FIGS. 15A–C an illustrative example of a height adjustable wheeled rotating support assembly 300d which includes a support member 340d, a wheel 110 and an axle 170. It also is within the scope of the present invention for any support member 340 according to the second aspect to be supported from the aperture bottom 10 in the fashion as described above in connection with the unidirectional rotating support assemblies 100,200 according to the first aspect of the present invention. Some of the features of the support member 340d are similar to those described above in connection with FIGS. 13G–I, accordingly reference shall be made to the foregoing discussion regarding these figures for related details not described more particularly below and/or not shown on FIGS. 14–15. Reference also shall be made to the foregoing discussion regarding the first aspect of the present invention for further details for any reference numeral shown on FIGS. 14–15 or refereed to hereinafter and not explicitly shown on the identified figures, or, if shown, not explicitly described hereinafter.

The support member 340d differs from the support member 340c shown in FIGS. 13G–I in that the support member top surface 348 need not extend outwardly so as to include an extension member and the support member 340d further includes a mechanism for adjusting the height or position of the axis of rotation for the wheel 110 or the centerline defined by the axle 170 with respect to the aperture bottom 10 and the work station top surface 6.

Alternatively, and as described above in connection with the first aspect, the work station aperture 4 can be machined or formed so the aperture bottom 10 is a predetermined distance from the work station top surface 6. The predetermined distance is established such that the axis of rotation is at the desired position with respect to the work station top surface 6 when the support member bottom surface 354 is resting on the aperture bottom 10.

Figure 14A:
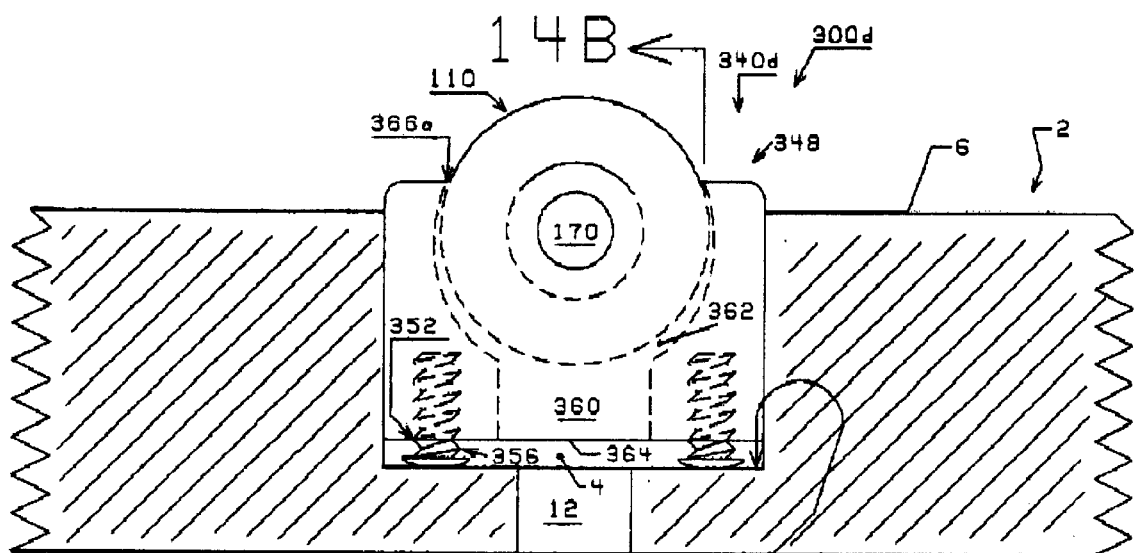
FIG. 14A is another cross-sectional view of the work station of FIG. 11 taken through line 12A—12A thereof with a unidirectional rotating support assembly being height adjustable.
Figure 14B:
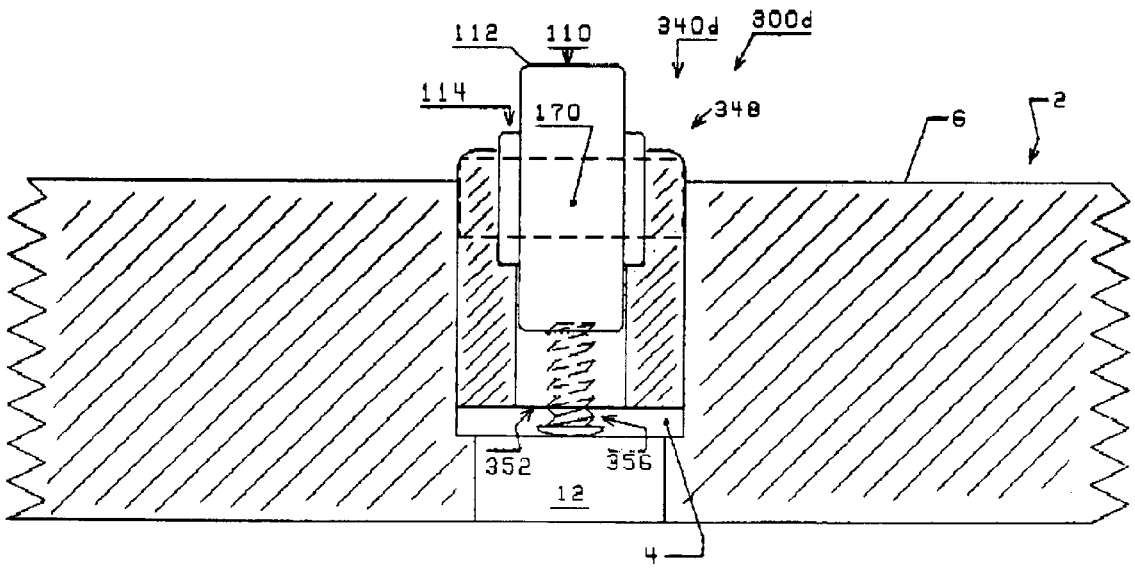
FIG. 14B is a cross-sectional view of FIG. 14A taken through line 14B—14B.
Figure 16A:
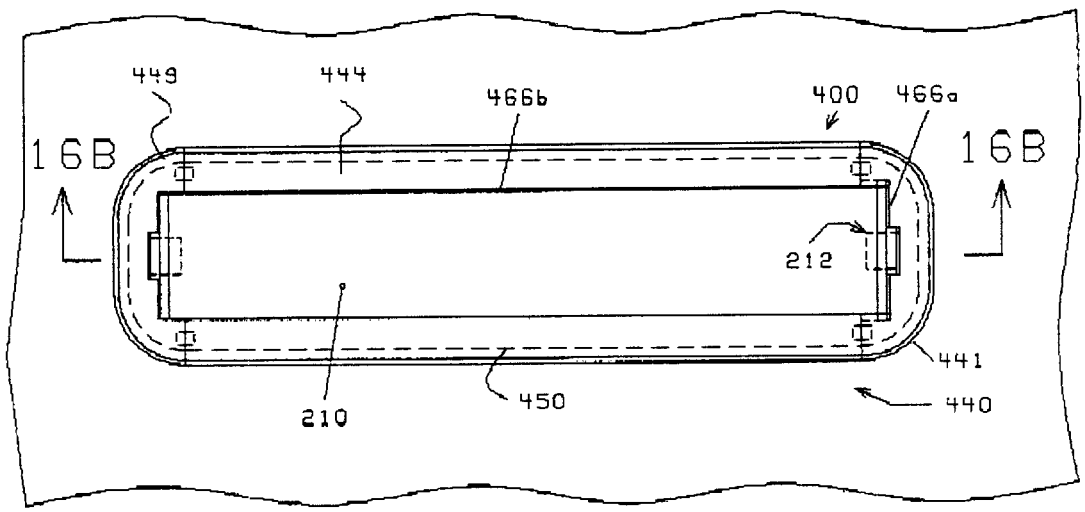
FIG. 16A is a partial plan view of the work station of FIG. 11 proximal an exemplary roller unidirectional rotating support assembly according to the second aspect.
Figure 16B:
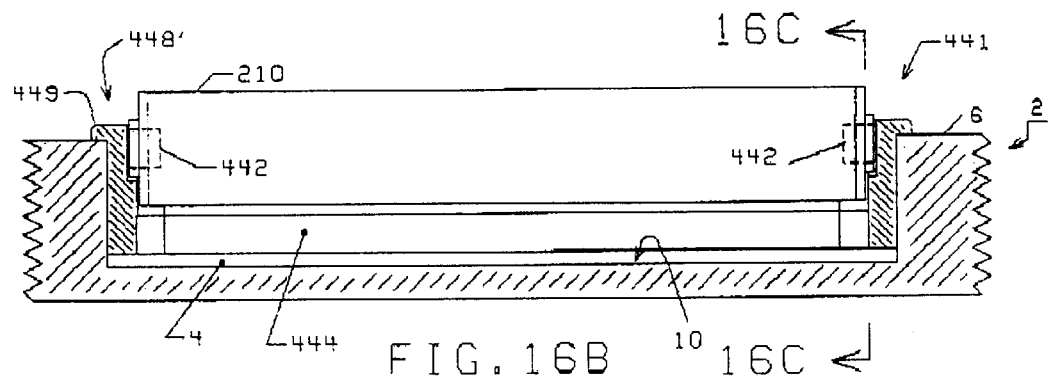
FIG. 16B is a cross-sectional view of FIG. 16A taken through line 16B—16B.
Figure 16C:
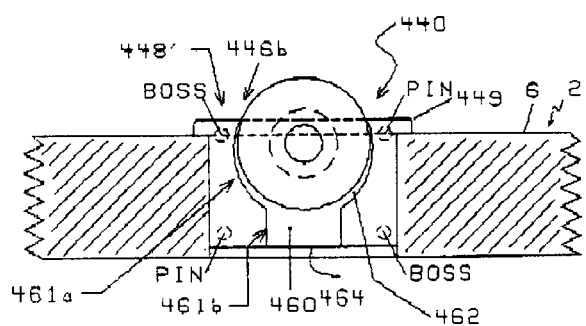
FIG. 16C is a cross-section view of FIG. 16B taken through line 16C—16C.

In an exemplary embodiment, and as shown in FIGS. 14–15, the height adjusting mechanism comprises an aperture 352 in the bottom surface 354 of the support member 340d and an extension member 356. A portion of the extension member 356 is securely disposed within the bottom surface aperture 352 and another portion of the extension member extends outwardly or downwardly from the support member bottom surface 354. As shown more clearly in FIGS. 14A–B, when the support member 340d is disposed in the aperture 4, an end or head of the extension member 356 rests upon the aperture bottom 10 so the support member bottom surface 354 is disposed a distance thereabove. Thus, by adjusting the exposed length of the extension member 356, the distance between the axis of rotation and the work station aperture bottom 10 is thereby adjusted and controlled.

Preferably, the bottom surface aperture 352 is a threaded aperture and the extension member 356 is threadably received therein. Thus, by rotating the extension member 356 in either of a clockwise or counterclockwise direction, the exposed length of the extension member extending from the bottom surface 354 of the support member 340d is thereby increased or decreased. This, thereby adjusts the distance between the support member bottom surface 354 and the aperture bottom 10 and thus, also adjusts the position or location of the axis of rotation with respect to the work station top surface 6.

As described more specifically in connection with the first aspect, the support member 340d can be further configured so as to have a top surface aperture in the support member top surface 348, which extends from the top surface to the cavity within the support member defined by the bottom surface aperture 352. Additionally an end of the extension member 356 can be configured so as to include a slot or other surface artifact known to those skilled in the art by which a slotted screw driver, phillips head screw driver, square headed screw driver, hex wrench or the like can mechanically engage the surface artifact so the extension member can be selectively rotated in either a counterclockwise or clockwise direction. Alternatively, different length extension members 356 can be provided and disposed in the bottom surface aperture 352 to thus control and adjust the exposed length of the extension member and the distance between the support member bottom surface 354 and the aperture bottom 10 also is controlled and adjusted thereby.

The foregoing adjustment to the position of the axis of rotation also controls and adjusts how much above the work station top surface 6 a portion of the wheel 110 will project. Thus, if a greater exposure of the wheel 110 is desired, the exposed length of the extension member 356 for each support member 340d is increased so as to raise the axis of rotation. The capability to adjust the position of the axis of rotation also provides a mechanism by which a wheeled unidirectional rotating support assembly 300d can be adapted for use with wheels 110 having different diameters. In this way, a support member 340d having a common configuration or arrangement can be used to rotatably support a wide range of wheel diameters.

In the foregoing discussion, the support members 340a–d are described as having a configuration or shape that is generally resistance to rotational movement when it is disposed within the work station aperture 4. This is not a limitation, however, as the support member according to any aspect or embodiment described herein can be of any configuration or shape including a generally circular cross-section or cylindrical that further includes a mechanism for limiting rotational movement.

Referring now to FIGS. 11 and 16A–C there is shown one embodiment of a roller unidirectional rotating support assembly 400 according to the second aspect of the present invention. Such a roller unidirectional rotating support assembly 400 includes a roller 210, and a support member 440. In the illustrated embodiment, each support member 440 includes two end support sections 441 and two side sections 444. The end and side support sections are configured and arranged so as to rotatably support the roller 210. In the illustrated embodiment, each end support section 441 and the two side support sections 444 are secured to and aligned with each other by means of pins and bosses in the sections. The pins and bosses are arranged in the end and side support sections 441,444 so that a pin or projection in one section is received in a corresponding and opposing boss or socket in the other section. It is within the scope of the present invention for any of a number of other means or mechanisms known to those skilled in the art be used for securing and aligning the end and side support sections 441,444 to form the support member 440 that can rotatably support the roller 210.

In the foregoing and the following the support member 440 is described as including two end support sections 441 and two side support sections 444. This shall not, however, constitute a limitation as it is within the scope of the present invention for the support member to be manufactured so as to comprise one or more structural elements. For example, the support member 440 can be made as a single element, two generally "U" shaped elements or two generally "L" shaped elements.

Each end support section 441 includes a depressed region that extends in a direction generally perpendicular to a plane defined by the support member top surface 448' and along an axis (e.g., long axis) of this plane. When the roller unidirectional rotating support assembly 440 is assembled, the depressed region in each end support section 441 and inner surfaces of the side support section 444 essentially form an interior aperture 460, where a portion of the roller 210 is rotatably disposed within the interior aperture such that a portion of the roller 210 is above the work station top surface 6.

The depressed region in each end support section 441 also is formed so as to include an upper portion 461a and lower portion 461b. The upper portion 461a preferably forms a cavity 462 in which is disposed a portion of the roller 210 and the lower portion 461b cooperates with the inner surfaces of the side support sections 444 so as to form an aperture 464 that communicates with the upper portion cavity 462. In a specific embodiment, and as illustrated, the aperture 464 is configured so as to form a through aperture. Alternatively, the aperture 464 is configured with a bottom so as to form a well within the support member 440. In this way, material that gets around the roller can be collected in the well formed by the aperture 464 and material being collected in the well can be removed later by a user. This described alternative embodiment, also applies to the other described support members 340,440 of the present invention.

The inner surface of each side support section 444 opposing the roller 210 is at an angle with respect to the work station top surface 6 and the inner surface is arranged so as to not interfere with the rotational movement of the roller. In a specific embodiment, the side support section inner surface is substantially perpendicular to the work station top surface 6. Alternatively, the side support section inner surface is configured much like the depressed region of the end support section 441, so as to include an upper portion that forms a cavity in which is disposed the lengthwise portion of the roller 210 and a lower portion that cooperates with each end support section lower portion 461b to form the lower portion aperture 464. The lower portion through aperture 464 defined by the end support sections 441 and the side support sections 444, provides a mechanism for directing debris or other material, that gets around the roller 210 and into the upper portion cavity 462, out of the upper portion cavity.

Figure 17A:
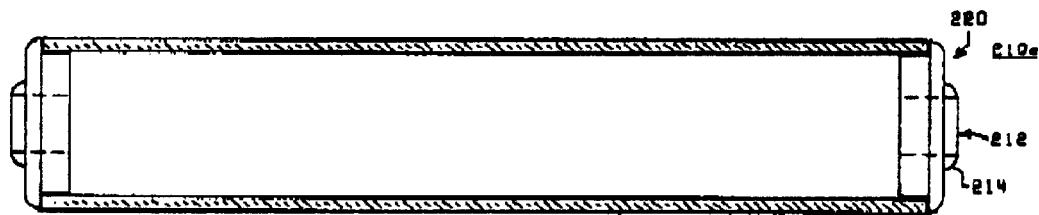
FIGS. 17A–D are schematic cross-section views of various exemplary rollers useable with a roller unidirectional support assembly according to the present invention.
Figure 17B:
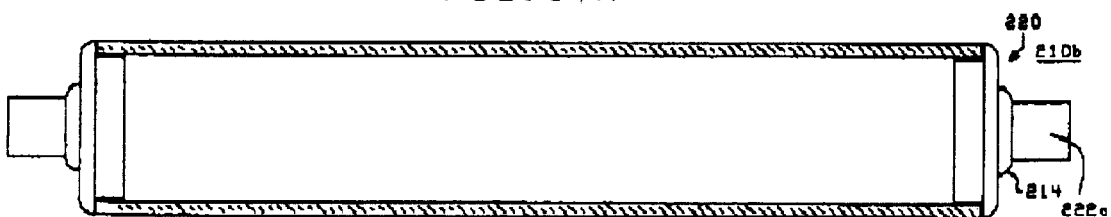
Figure 17C:
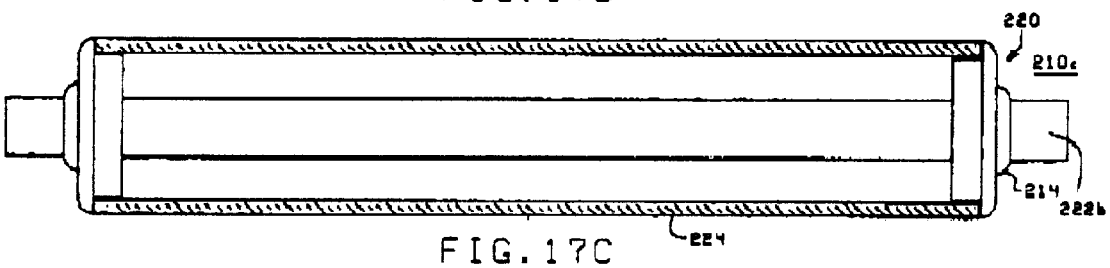

Correspondingly, each work station aperture 4 is configured so as to be in the form of a through aperture that extends between the top surface 6 and the bottom surface of the work station 2, as illustrated in FIG. 17C. Alternatively, and with reference to FIG. 14B, the work station aperture 4 is formed so as to have a bottom 10 that is configured so as to include a through aperture 12 in a portion of the aperture bottom proximal the lower portion through aperture 464. In this way, the debris or other material that is exiting from the lower portion through aperture 464 also can exit from the work station aperture 4, thereby minimizing the potential for jamming of or damaging the wheel 110 by such debris or material. As also shown in FIGS. 17A,B, the aperture 4 can be a blind hole of a predetermined shape formed in the work station top surface 6 that has a bottom 10.

In a specific embodiment, the upper portion cavity 462 for the end support section 441, and the inner surface of the side support section 444 are configured so the end surfaces of the cavity and the side support section inner surfaces are arranged to minimize the size of the gap 466 or opening between the exterior circumferential surfaces of the roller 210 and the opposing surface of the upper portion cavity and side section inner surfaces that are proximal the top surface 448' of each of the end and side support sections 441, 444. Preferably, the depressed region(s) of each end support section 441 also is sized and configured to minimize the opening or gap 466a between the ends of the roller 210 and the opposing surfaces of the end support section upper portion 461a. When the side support sections are configured with upper and lower portions as described above, the opening or gap 466b between the roller sides and the opposing surfaces of the side section support portion is minimized as described above. The minimization of these gaps 466a,b thereby minimizes or restricts the amount and kind (e.g., size, shape and/or configuration) of debris or material that can enter into the interior aperture 460 formed by the end and side support sections 441,444 as well as to protect human extremities (e.g. fingers).

The end and bottom surfaces of the upper portion cavity in the end support sections 441 and/or the alternative side support section are further arranged so as to form a curved surface about the axis of rotation for the roller 210. More particularly, the end and bottom surfaces of the upper portion cavity are curved such that the gap 461b between the exterior circumferential surfaces of the roller 210 and the opposing surfaces of upper portion cavity increases as the curved surfaces approach the lower portion through aperture 464 formed by the end and side support sections 441,444. The curved shape, as well as the increasing size of the gap, generally facilitates the movement of debris and material towards the lower portion through aperture 464. The curved shape, however, is not a limitation for as discussed above other geometric shapes and configurations are contemplated in the present invention.

As indicated above, the end support sections 441 are each particularly configured to rotatably support the roller 210. More specifically, each of the end support sections 441 includes a projecting member 442 that projects inwardly from the side surfaces of the end support section upper portion 461a so each projecting member is received within the hub through aperture 116 of the roller. As indicated in the discussion above regarding the projecting member according to the first aspect of the present invention, the projecting member 442 can have any geometric shape that would otherwise be consistent with the capability of rotatably supporting the roller including cylindrical shapes or a spline shape. For further details regarding the projecting member 442 including for example, the length of the projecting member and adjusting the location of the projecting member or axis of rotation with respect to the work station top surface 6, reference should be made to the foregoing discussion for the corresponding component for the first aspect.

When the support member end and side support sections 441,444 are mated to each other, the support member 440 formed thereby includes a proximal end 446, sides 450 and a distal end 447. The end and side support sections 441,444 also are sized and arranged so that when they are mated to each other there is limited to no play or motion between the distal and proximal ends 446,447 and the sides 450 and the opposing surfaces of the work station aperture 4 when the support member 440 is disposed in the work station aperture. In this way, the axis of rotation for the roller 210 is generally fixed with respect to the work station aperture 4 so there is limited to no motion of the roller 210 in the plane defined by the top surface 448' transverse to and/or along the axis of rotation. Thus, an article passing across the work station top surface 6 and being rotatably supported by the roller unidirectional rotating support assembly 400 should not cause each support member 440 in the top surface to be moved laterally or longitudinally within the corresponding work station aperture 4.

The support member top surface 448' formed by the mating of the end and side support sections 441,444 is configured so as to include an extension segment 449 that extends outwardly from and beyond the sides 450 and ends 446,447 of the support member 440. In this way, the support member 440 is supported from the work station top surface 6 by the extension segment 449, when the support member is disposed in the work station aperture 4. The extension segment 449 is generally configured and sized such that it overlaps the work station top surface 6 proximal the work station aperture 4 an amount that is sufficient to support the support member 440 so that support member is not displaced within or into the work station aperture when in either a loaded or unloaded condition. Thus, an article passing across the work station top surface 6 and being rotatably supported by one or more roller unidirectional rotating support assemblies 400 should not cause each support member 440 in the top surface to be moved vertically within the corresponding work station aperture 4.

For other and further details regarding the ends 446,447, sides 450, top surface 448' and extension segment 449 of the second aspect, reference shall be made to the above discussion regarding the distal and proximal ends, sides, top surface and extension segment according to either of the first or second first aspect.

The roller 210 is any one of number of devices known to those skilled in the art which can be used with the support members herein described to rotatably support an article passing thereover. In the illustrated embodiment, the roller 210 is configured with an aperture 212 that is sized to received therein the projecting member 442 of each end support member 441. Reference also should be made to FIGS. 17A–D and the discussion thereto for further details regarding exemplary rollers and/or components thereof useable with the roller unidirectional rotating support assembly 400 of the present invention. Reference also should be made to the foregoing discussion regarding first aspect of the present invention for further details, such as the length and other structural features, of the roller 210.

Although the foregoing is illustrative or exemplary of one embodiment of a roller unidirectional rotating support assembly 400 according to the second aspect of the present invention, it is within the scope of the present invention for the roller 210 and the support member 440 therefore to be adapted for use with any of the support members or support member sections hereinabove described. In particular the roller 210 can be configured for use with the support member sections 341 shown for any of the above-described wheeled unidirectional support assemblies 300 according to the second aspect. More particularly, the end support sections comprising the support member 440 can be arranged like that shown in any of FIGS. 12–15. For example, and with particular reference to FIGS. 18C and FIGS. 13D–F, the roller 210 can further include an axle and each end section is configured with an axle receiving aperture to receive therein and end portion of the axle.

Referring now to FIGS. 17A–D, there is shown some exemplary rollers 210a–d that are useable with any of the above identified support members 140,340,440 of the present invention that are complimentary to the type of roller being described. It should be recognized that the following is illustrative and that it is within the scope of the present invention for any of the unidirectional rotating support assemblies of the present invention to be adapted for use with any roller that are known in the art such as those used in the material handling field.

In general, the rollers 210a–d include a tubular member 224 and end members 220 that are secured in the ends of the tubular member. The tubular member 224 is made from any of a number of materials known to those skilled in the art, including metals and plastics, that is appropriate for the intended use. The thickness of the tubular member 224 also is established so that the tubular member does not substantially deflect or bend when an article is passed over the roller 210a–d and thereby imposing a load thereon. A coating or material layer also may be applied to the axial and radially extending exterior surfaces of the tubular member 224 so as to facilitate passage of the article being rotatbly supported as well as to minimize damage to the article (e.g., scratching of a housing).

There is shown in FIG. 17A, one exemplary roller in which the hub 214 of each end member 220 is configured so as to include an aperture 212 therein that can be in the form of a through hole or a blind hole for example. As described hereinabove in a number of the exemplary embodiments for unidirectional rotating support assemblies according to the present invention, a projecting member of the support member 140,340, 440 is received in the hub aperture 214 so the roller 210a is rotatably supported from the projecting member or by means of an axle passing through the hub apertures.

There is shown in FIG. 17B another exemplary roller 210b in which the end member hub 214 is configured so as to have a projecting member 222a that extends outwardly therefrom. As described hereinabove in a number of the exemplary embodiments for unidirectional rotating support assemblies, the support member 140,340,440 are configurable with axle receiving apertures that can receive at least an end portion of the roller projecting members, whereby the roller 210b would be rotatably supported therefrom.

There is shown in FIG. 17C a further exemplary roller 210c further including an axle 222b and in which the hub 214 for each end member 220 is configured so as to have a through aperture. The axle 222b is arranged so as to extend within and along the length of the tubular member 224 and is passed through the end member hub apertures 212 so that the ends of the axle extend outwardly from the hubs 214. As described above for FIG. 17B, the end portions of the axle 222b can be received in the axle receiving apertures in the support members.

Figure 17D:
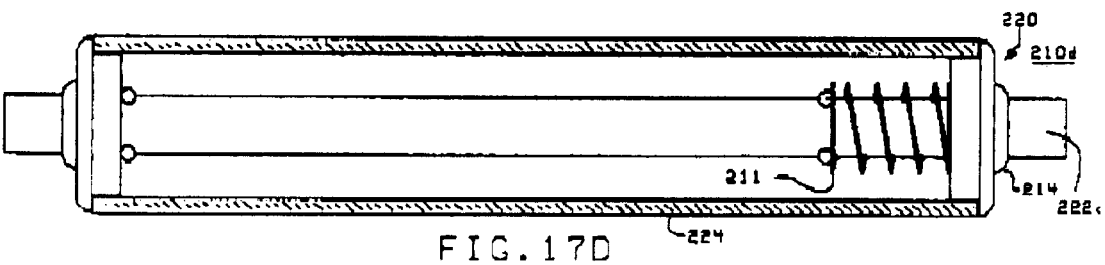

In an alternative exemplary embodiment, and as shown in FIG. 17D, the roller 210d further includes a spring 211 and an axle 222d that is configured for use with the spring. The axle 222d is arranged so as to extend within and along the length of the tubular member 224 and is passed through the hub apertures 212 so that the ends of the axle extend outwardly from the end member hubs 214. As described above for FIG. 17B, the end portions of the axle 222d can be received in the axle receiving apertures in the support members. The spring is disposed with the tubular member 224 and the spring and the axle 220d are configured and arranged so that the spring loads up the axle.

In the illustrated embodiments, the rollers 210a–d are shown as being a generally cylindrical tubular member 224. As the foregoing is exemplary, it is not exhaustive of all the roller shapes, sizes and configurations that are known or available in the art and thus should not be construed as a limitation on the design of the rollers useable or adaptable for use with the unidirectional rotating support members according to the present invention. In a particular embodiment, the roller is a tapered roller, where the outer diameter of the roller generally varies as a function of the axial length of a given roller (e.g., slopes from left to right).

Referring now to FIGS. 18A–D, there is shown some exemplary wheels 110a,b that are useable with any of the above identified support members 140,340,440 of the present invention that are complimentary to the type of wheel being described. It should be recognized that the following is illustrative and that it is within the scope of the present invention for any of the wheeled unidirectional rotating support assemblies of the present invention to be adapted for use with any wheel that is known in the art such as those used in the material handling field.

Figure 18A:
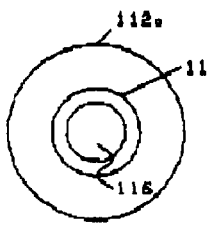
FIGS. 18A–D are various schematic views of various exemplary wheels useable with a wheeled unidirectional support assembly according to the present invention.
Figure 18B:
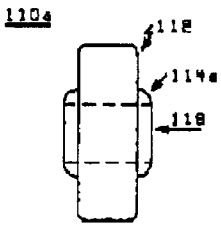

There is shown in FIGS. 18A,B one exemplary wheel 110*a* that includes a rotating part 112*a* and a hub 114*a*. The hub 114*a* is typically and rotatably interconnected to the rotating part 112*a* by a bearing system, bushing or the like, whereby the rotating part can rotate about the hub with little or no friction in the loaded or unloaded condition. In the illustrated embodiment, the hub 114*a* is configured so as to include an aperture 116 therein that can be in the form of a through hole. Alternatively, the hub aperture 116 is in the form of a blind hole.

As described hereinabove in a number of the exemplary embodiments for unidirectional rotating support assemblies according to the present invention, a projecting member of the support member 140,340, 440 143 is received in the hub aperture 116 so the rotating part 112*a* is rotatably supported from the projecting member or by means of an axle passing through the hub apertures. In addition to the above-described bearing system, the hub 114*a* can comprise a bushing that is secured to the rotating part 112*a*. In this case, the rotating part/bushing combination could rotate about the projecting member or axle.

The rotating part 112*a* is made from any of a number of materials known to those skilled in the art, including metals and plastics, that is appropriate for the intended use. The diameter of the rotating part 112 and the axial length of the rotating part that is in contact with the article in transit across the wheel is established so to be capable of withstanding the load being imposed thereon when an article is passed over the rotating part 112*a*. Additionally, the axial length also is established so as to minimize the potential for damage to the article because of point loading. Further, a coating or material layer is applied to the axial and circumferential extending exterior surface of the rotating part 112*a*, the surface that contacts the article in transit, so as to facilitate passage of the article being rotatably supported as well as to minimize damage to the article (e.g., scratching of a housing). For example, a rubber layer with tire like treads can be applied to this exterior surface so it would not mark the article and/or to increase the coefficient of friction of the exterior surface of the rotating part 112*a*.

Figure 18C:
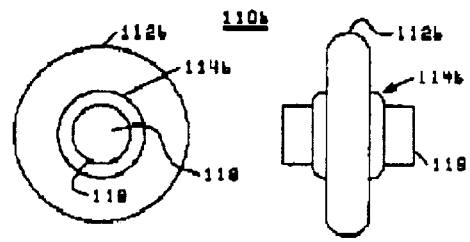
Figure 18D:
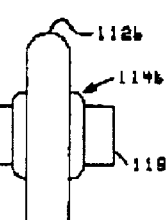

There is shown in FIGS. 18C,D another exemplary wheel 110*b* that includes a rotating part 112*b* and a hub 114*b*. The hub 114*b* is typically and rotatably interconnected to the rotating part 112*b* by a bearing system, bushing or the like, whereby the rotating part can rotate about the hub with little or no friction in the loaded or unloaded condition. In general, for this embodiment the hub is configured so as to include a shaft member that extends outwardly from sides of the hub. In the illustrated embodiment, the hub is configured with a through aperture 116 and the shaft member 118 is received with the hub aperture 116. In a specific embodiment a slide or tight fit is established between the inner surfaces of the hub aperture 116 and the outer surfaces of the shaft member 118 so the shaft member is secured to the hub 114*b*. Alternatively, the shaft member and the hub are integrally formed so that the shaft member is an extension of the hub. As described hereinabove, in a number of the exemplary embodiments for unidirectional rotating support assemblies, the support member 140,340,440 are configurable with axle receiving apertures that can receive at least an end portion of the shaft member 118, whereby the rotating part 112*b*, and thus the wheel 110*b*, would be rotatably supported therefrom.

The rotating part 112*b* of this particular illustrative embodiment differs from the rotating part 112*a* illustrated in FIGS. 7A,B in that the circumferential and axial extending exterior surfaces have different profiles. Specifically the exterior surface of rotating part 112*a*, as illustrated in FIGS. 7A,B, is substantially flat in the axial direction whereas the exterior surface of the rotating part 112*b*, as illustrated in FIGS. 7C,D, is arcuate. Thus, reference also shall be made to the discussion regarding FIGS. 7A,B for further details regarding the rotating part 112*b* for this particular illustrative embodiment, including sizing and the use of coatings or material layers on the exterior surface.

Although a preferred embodiment of the invention has been described using specific terms, such description is for illustrative purposes only, and it is to be understood that changes and variations may be made without departing from the spirit or scope of the following claims.

What is claimed is:

1. A unidirectional rotatable support assembly, one assembly for each aperture of a plurality of apertures in a work surface, said each aperture having a shape, the unidirectional rotatable support assembly comprising:
   a unidirectional rotating member;
   a support member, a portion of which is configured so as to be received within said each aperture;
   shaft means disposed within the support member and being configured to rotatably support the unidirectional rotating member;
   wherein the support member and the shaft means are configured such that a portion of the unidirectional rotating member is maintained above the work surface.

2. A unidirectional rotatable support assembly, one assembly for each aperture of a plurality of apertures in a work surface, said each aperture having a shape, the unidirectional rotatable support assembly comprising:
   a unidirectional rotating member;
   a support member, a portion of which is configured so as to be received within said each aperture, the support member including:
      an aperture in which is disposed a portion of the unidirectional rotating member, and
      a support mechanism being configured to rotatably support the unidirectional rotating member;
   wherein the support member and the support mechanism are configured such that a portion of the unidirectional rotating member is maintained above the work surface; and
   means for adjusting the relative position of the unidirectional rotating member with respect to the work surface, said adjusting means comprising a threaded extension member.

3. The unidirectional rotatable support assembly according to claim 2, wherein the support member is configured so as to include an extension segment that extends outwardly from at least a portion of the outer circumference of the support member, whereby a bottom surface of the extension segment rests upon the work surface.

4. The unidirectional rotatable support assembly according to claim 3, wherein the extension segment is proximal a top surface of the support member.

5. The unidirectional rotatable support assembly according to claim 3, wherein the extension segment extends outwardly from essentially the entire outer circumference of the support member.

6. The unidirectional rotatable support assembly according to claim 2, wherein a portion of the support member aperture is configured so as to form a cavity within the support member, in which cavity is received a portion of the unidirectional rotating member.

7. The unidirectional rotatable support assembly according to claim 2, wherein the unidirectional rotating member is one of a wheel or a roller.

8. The uni-directional rotatable support assembly according to claim 3, wherein the work surface is configured such that at least one of said plurality of apertures is disposed in a depression in the work surface and wherein the bottom surface of the extension segment rests upon the top surface of the depression.

9. The uni-directional rotatable support assembly according to claim 3, where the work surface is configured such that at least one of said plurality of apertures is disposed in a raised region of the work surface and wherein the bottom surface of the extension segment rests upon the top surface of the raised region.

10. A unidirectional rotatable support assembly, one assembly for each aperture of a plurality of apertures in a work surface, said each aperture having a shape, the unidirectional rotatable support assembly comprising:
  a unidirectional rotating member;
  a support member, a portion of which is configured so as to be received with said each aperture, the support member including:
    an aperture in which is disposed a portion of the unidirectional rotating member,
    an extension segment that extends outwardly from at least a portion of the outer circumference of the support member, whereby a bottom surface of the extension segment rests upon the work surface, and
    a support mechanism being configured to rotatably support the unidirectional rotating member; and
  wherein the support member and the support mechanism are configured such that a portion of the unidirectional rotating member is maintained above the work surface and wherein the support mechanism includes two opposed shaft receiving apertures disposed in inner surfaces of the support member aperture and the undirectional rotating member includes a shaft member, each end of which is received in one of the shaft receiving apertures.

11. The unidirectional rotatable support assembly according to claim 10, wherein the unidirectional rotating support member is configured with a through aperture in which is received the shaft member.

12. A unidirectional rotatable support assembly, one assembly for each aperture of a plurality of apertures in a work surface, said each aperture having a shape, the unidirectional rotatable support assembly comprising:
  two support members spaced from each other;
  a unidirectional rotating member;
  a support mechanism being interconnected to the two support members and being configured to rotatably support the unidirectional rotating member;
  each of the two support members being configured so a portion of each of the two support members is securely disposed in opposing portions of said each aperture and each of the two support members also being configured so as to include an extension segment that extends outwardly from at least one side of said each of the two support members, whereby a bottom surface of the extension segment rests upon the work surface when the portion of each of the two support members is securely disposed in opposing portions of said each aperture; and
  wherein said each of the two support members and the supporting mechanism are configured such that a portion of the unidirectional rotating member is maintained above the work surface.

13. The unidirectional rotatable support assembly according to claim 12, further comprising an adjusting mechanism that acts on the two support members so as to adjust the relative position of the unidirectional rotating member with respect to the work surface.

14. The unidirectional rotatable support assembly according to claim 13, wherein said each aperture includes a bottom surface and wherein the adjusting mechanism extends between a bottom surface of said each of the two support members and the aperture bottom surface.

15. The unidirectional rotatable support assembly according to claim 14, wherein the adjusting mechanism includes an adjuster for said each of the two support members, where the adjuster extends between the support member bottom surface and the aperture bottom surface.

16. The unidirectional rotatable support assembly according to claim 12, wherein the extension segment is proximal a top surface of said each of the two support members.

17. The unidirectional rotatable support assembly according to claim 12, wherein the extension segment extends outwardly from three sides of said each of the two support members.

18. The unidirectional rotatable support assembly according to claim 12, wherein the unidirectional rotating member is one of a skate wheel or a roller.

19. A unidirectional rotatable support assembly, one assembly for each aperture of a plurality of apertures in a work surface, said each aperture having a shape, the unidirectional rotatable support assembly comprising:
  a unidirectional rotating member;
  a support member, a portion of which is configured so as to be received with said each aperture, the support member including:
    an aperture in which is disposed a portion of the unidirectional rotating member,
    an extension segment that extends outwardly from at least a portion of the outer circumference of the support member, whereby a bottom surface of the extension segment rests upon the work surface, and
    a support mechanism being configured to rotatably support the unidirectional rotating member; and
  wherein the support member and the support mechanism are configured such that a portion of the unidirectional rotating member is maintained above the work surface and wherein the support mechanism includes two opposed shaft members projecting outwardly from inner surfaces of the support member aperture and the unidirectional rotating member is configured so as to receive therein the two opposed shaft members whereby the unidirectional rotating member is rotatably supported.

20. An article transport system for use in combination with a work surface having a plurality of apertures in the work surface, each aperture having a shape, said article transport system comprising:
  a plurality of unidirectional rotating support assemblies, each of said plurality of unidirectional rotating support assemblies including:

a unidirectional rotating member;

a support member, a portion of which is configured so as to be received with said each aperture, the support member including:

an aperture in which is disposed a portion of the unidirectional rotating member, and a support mechanism being configured to rotatably support the unidirectional rotating member;

wherein the support member and the support mechanism are configured such that a portion of the unidirectional rotating member is maintained above the work surface; and means for adjusting the relative position of the unidirectional rotating member with respect to the work surface, said adjusting means comprising a threaded extension member.

21. The article transport system of claim 20, wherein each of said plurality of support members is configured so as to include an extension segment that extends outwardly from at least a portion of the outer circumference of each support member, whereby a bottom surface of the extension segment rests upon the work surface.

22. An article transport system for use in combination with a work surface having a plurality of apertures in the work surface, each aperture having a shape, said article transport system comprising a plurality of unidirectional rotating support assemblies, each of said plurality of unidirectional rotating support assemblies including:

a unidirectional rotating member;

a support member, a portion of which is configured so as to be received with said each aperture, the support member including:

an aperture in which is disposed a portion of the unidirectional rotating member, and a support mechanism being configured to rotatably support the unidirectional rotating member; and wherein the support member and the support mechanism are configured such that a portion of the unidirectional rotating member is maintained above the work surface and wherein the support mechanism includes two opposed shaft receiving apertures disposed in inner surfaces of the support member aperture and the unidirectional rotating member includes a shaft member, each end of which is received in one of the shaft receiving apertures.

23. An article transport system for use in combination with a work surface having a plurality of apertures in the work surface, each aperture having a shape, said article transport system comprising a plurality of unidirectional rotating support assemblies, each of said plurality of unidirectional rotating support assemblies including:

a unidirectional rotating member;

a support member, a portion of which is configured so as to be received with said each aperture, the support member including:

an aperture in which is disposed a portion of the unidirectional rotating member, and a support mechanism being configured to rotatably support the unidirectional rotating member; and wherein the support member and the support mechanism are configured such that a portion of the unidirectional rotating member is maintained above the work surface and wherein the support mechanism includes two opposed shaft members projecting outwardly from inner surfaces of the support member aperture and the unidirectional rotating member is configured so as to receive therein the two opposed shaft members whereby the unidirectional rotating member is rotatably supported.

24. The article transport system of claim 23, wherein a portion of the support member aperture is configured so as to form a cavity within the support member, in which cavity is received a portion of the unidirectional rotating member.

25. The article transport system of claim 23, further comprising one of a pop-up ball assembly, retractable ball transfer assembly, omni-directional ball transfers and pop-up pad assembly.

26. An article transport system for use in combination with a work surface having a plurality of apertures in the work surface, each aperture having a shape, said article transport system comprising:

a plurality of unidirectional rotating support assemblies, each of said plurality of unidirectional rotating support assemblies including:

two support members spaced from each other;

a unidirectional rotating member;

a support mechanism being interconnected to the two support members and being configured to rotatably support the unidirectional rotating member;

each of the two support members being configured so a portion of each of the two support members is securely disposed in opposing portions of said each aperture and each of the two support members being configured so as to include an extension segment that extends outwardly from at least one side of said each of the two support members, whereby a bottom surface of the extension segment rests upon the work surface when the portion of each of the two support members is securely disposed in opposing portions of said each aperture; and wherein said each of the two support members and the supporting mechanism are configured such that a portion of the unidirectional rotating member is maintained above the work surface.

* * * * *